(12) United States Patent
Shetty et al.

(10) Patent No.: US 9,115,908 B2
(45) Date of Patent: Aug. 25, 2015

(54) SYSTEMS AND METHODS FOR MANAGING A PROGRAMMABLE THERMOSTAT

(75) Inventors: Pradeep Shetty, Bangalore (IN); Wendy Foslien, Woodbury, MN (US); Keith Curtner, St. Paul, MN (US); Purnaprajna R. Mangsuli, Bangalore (IN); Soumitri Kolavennu, Blaine, MN (US)

(73) Assignee: Honeywell International Inc., Morristown, NJ (US)

( * ) Notice: Subject to any disclaimer, the term of this patent is extended or adjusted under 35 U.S.C. 154(b) by 708 days.

(21) Appl. No.: 13/192,141

(22) Filed: Jul. 27, 2011

(65) Prior Publication Data

US 2013/0030600 A1    Jan. 31, 2013

(51) Int. Cl.
| | |
|---|---|
| G05D 23/00 | (2006.01) |
| F24F 11/00 | (2006.01) |
| G01M 1/38 | (2006.01) |
| G05B 13/00 | (2006.01) |
| G05B 15/00 | (2006.01) |

(52) U.S. Cl.
CPC ....... *F24F 11/006* (2013.01); *F24F 2011/0067* (2013.01)

(58) Field of Classification Search
CPC .................. F24F 11/006; F24F 2011/0067
USPC .................. 700/276–278, 299–300
See application file for complete search history.

(56) References Cited

U.S. PATENT DOCUMENTS

| | | | |
|---|---|---|---|
| 2,202,008 A | 5/1940 | Hill | |
| 3,643,183 A | 2/1972 | Geffe | |
| 3,715,693 A | 2/1973 | Fletcher et al. | |
| 3,758,885 A | 9/1973 | Voorman et al. | |
| 3,991,357 A | 11/1976 | Kaminski | |
| 4,032,867 A | 6/1977 | Engeler et al. | |
| 4,046,532 A | 9/1977 | Nelson | |
| 4,079,366 A | 3/1978 | Wong | |
| 4,174,807 A | 11/1979 | Smith et al. | |
| 4,206,872 A | 6/1980 | Levine | |
| 4,223,831 A | 9/1980 | Szarka | |
| 4,224,615 A | 9/1980 | Penz | |

(Continued)

FOREIGN PATENT DOCUMENTS

| | | |
|---|---|---|
| AU | 2010276364 A1 | 2/2012 |
| CA | 2202008 | 10/1998 |

(Continued)

OTHER PUBLICATIONS

"Image Rejection in Mixers," copyright AAA, 1996.

(Continued)

*Primary Examiner* — Ramesh Patel
(74) *Attorney, Agent, or Firm* — Seager, Tufte & Wickhem LLP

(57) ABSTRACT

Systems and methods for managing a programmable thermostat are described herein. One or more system embodiments include a programmable thermostat having a first management profile; a data acquisition subsystem; and a data analysis subsystem. The data acquisition subsystem is configured to receive thermostat data from the programmable thermostat, and the data analysis subsystem is configured to receive the thermostat data from the data acquisition subsystem, and determine a second management profile for the programmable thermostat based, at least in part, on the thermostat data.

20 Claims, 3 Drawing Sheets

(56) References Cited

U.S. PATENT DOCUMENTS

| | | |
|---|---|---|
| 4,264,034 A | 4/1981 | Hyltin et al. |
| 4,264,874 A | 4/1981 | Young |
| 4,298,946 A | 11/1981 | Hartsell et al. |
| 4,308,991 A | 1/1982 | Peinetti et al. |
| 4,316,577 A | 2/1982 | Adams et al. |
| 4,335,847 A | 6/1982 | Levine |
| 4,337,822 A | 7/1982 | Hyltin et al. |
| 4,341,345 A | 7/1982 | Hammer et al. |
| 4,345,162 A | 8/1982 | Hammer et al. |
| 4,350,966 A | 9/1982 | Nelson |
| 4,382,544 A | 5/1983 | Stewart |
| 4,386,649 A | 6/1983 | Hines et al. |
| 4,388,692 A | 6/1983 | Jones et al. |
| 4,389,577 A | 6/1983 | Anderson et al. |
| 4,408,711 A | 10/1983 | Levine |
| 4,431,134 A | 2/1984 | Hendricks et al. |
| 4,442,972 A | 4/1984 | Sahay et al. |
| 4,446,913 A | 5/1984 | Krocker |
| 4,467,178 A | 8/1984 | Swindle |
| 4,469,274 A | 9/1984 | Levine |
| 4,479,604 A | 10/1984 | Didner |
| 4,506,827 A | 3/1985 | Jamieson et al. |
| 4,529,947 A | 7/1985 | Biard et al. |
| 4,531,064 A | 7/1985 | Levine |
| 4,549,169 A | 10/1985 | Moura et al. |
| 4,550,312 A | 10/1985 | Galloway et al. |
| 4,577,977 A | 3/1986 | Pejsa |
| 4,595,430 A | 6/1986 | Baker |
| 4,606,401 A | 8/1986 | Levine et al. |
| 4,614,945 A | 9/1986 | Brunius et al. |
| 4,615,380 A | 10/1986 | Beckey |
| 4,621,336 A | 11/1986 | Brown |
| 4,622,544 A | 11/1986 | Bially et al. |
| 4,644,320 A | 2/1987 | Carr et al. |
| 4,669,654 A | 6/1987 | Levine et al. |
| 4,674,027 A | 6/1987 | Beckey |
| 4,685,614 A | 8/1987 | Levine |
| 4,717,333 A | 1/1988 | Carignan |
| 4,725,001 A | 2/1988 | Carney et al. |
| 4,751,961 A | 6/1988 | Levine et al. |
| 4,768,706 A | 9/1988 | Parfitt |
| 4,812,785 A | 3/1989 | Pauker |
| 4,819,714 A | 4/1989 | Otsuka et al. |
| 4,837,731 A | 6/1989 | Levine et al. |
| 4,843,638 A | 6/1989 | Walters |
| 4,868,795 A | 9/1989 | McDavid et al. |
| 4,881,686 A | 11/1989 | Mehta |
| 4,897,798 A | 1/1990 | Cler |
| 4,918,425 A | 4/1990 | Greenberg et al. |
| 4,918,439 A | 4/1990 | Wozniak et al. |
| 4,924,404 A | 5/1990 | Reinke, Jr. |
| 4,933,668 A | 6/1990 | Oyet et al. |
| 4,948,040 A | 8/1990 | Kobayahi et al. |
| 4,968,966 A | 11/1990 | Jasinski et al. |
| 4,992,779 A | 2/1991 | Sugino et al. |
| 4,997,029 A | 3/1991 | Otsuka et al. |
| 4,998,024 A | 3/1991 | Kirk et al. |
| 5,003,619 A | 3/1991 | Morris et al. |
| 5,005,365 A | 4/1991 | Lynch |
| 5,012,973 A | 5/1991 | Dick et al. |
| 5,038,851 A | 8/1991 | Mehta |
| 5,053,752 A | 10/1991 | Epstein et al. |
| 5,056,712 A | 10/1991 | Enck |
| 5,063,371 A | 11/1991 | Oyer et al. |
| 5,065,813 A | 11/1991 | Berkeley et al. |
| 5,086,385 A | 2/1992 | Launey et al. |
| 5,088,645 A | 2/1992 | Bell |
| 5,097,671 A | 3/1992 | Jeong-Hun |
| 5,115,967 A | 5/1992 | Wedekind |
| 5,140,310 A | 8/1992 | DeLuca et al. |
| 5,161,606 A | 11/1992 | Berkeley et al. |
| 5,165,465 A | 11/1992 | Kenet |
| 5,170,935 A | 12/1992 | Federspiel et al. |
| 5,181,653 A | 1/1993 | Foster et al. |
| 5,187,797 A | 2/1993 | Nielsen et al. |
| 5,192,020 A | 3/1993 | Shah |
| 5,192,874 A | 3/1993 | Adams |
| 5,211,332 A | 5/1993 | Adams |
| 5,224,649 A | 7/1993 | Brown et al. |
| 5,230,482 A | 7/1993 | Ratz et al. |
| 5,238,184 A | 8/1993 | Adams |
| 5,240,178 A | 8/1993 | Dewolf et al. |
| 5,244,146 A | 9/1993 | Jefferson |
| 5,251,813 A | 10/1993 | Kniepkamp |
| 5,255,975 A | 10/1993 | Adams |
| 5,259,445 A | 11/1993 | Pratt et al. |
| 5,270,952 A | 12/1993 | Adams et al. |
| 5,287,109 A | 2/1994 | Hesse |
| 5,294,047 A | 3/1994 | Schwer |
| 5,303,612 A | 4/1994 | Odom et al. |
| 5,322,034 A | 6/1994 | Willham et al. |
| 5,329,991 A | 7/1994 | Mehta et al. |
| 5,348,078 A | 9/1994 | Dushane et al. |
| 5,361,983 A | 11/1994 | Bird |
| 5,382,948 A | 1/1995 | Richmond |
| 5,386,577 A | 1/1995 | Zenda |
| 5,390,206 A | 2/1995 | Rein et al. |
| 5,392,003 A | 2/1995 | Nag et al. |
| 5,395,042 A | 3/1995 | Riley et al. |
| 5,428,388 A | 6/1995 | Von Bauer et al. |
| 5,428,602 A | 6/1995 | Kemppainen |
| 5,428,637 A | 6/1995 | Oliva, Jr. et al. |
| 5,430,409 A | 7/1995 | Buck et al. |
| 5,438,329 A | 8/1995 | Gastouniotis et al. |
| 5,451,898 A | 9/1995 | Johnson |
| 5,465,399 A | 11/1995 | Oberholtzer et al. |
| 5,476,221 A | 12/1995 | Seymour |
| 5,481,259 A | 1/1996 | Bane |
| 5,482,209 A | 1/1996 | Cochran et al. |
| 5,485,954 A | 1/1996 | Guy et al. |
| 5,499,196 A | 3/1996 | Pacheco |
| 5,526,422 A | 6/1996 | Keen |
| 5,537,106 A | 7/1996 | Mitsuhashi |
| 5,544,036 A | 8/1996 | Brown, Jr. et al. |
| 5,555,927 A | 9/1996 | Shah |
| 5,566,879 A | 10/1996 | Longtin |
| 5,570,837 A | 11/1996 | Brown et al. |
| 5,594,447 A | 1/1997 | Usui et al. |
| 5,595,342 A | 1/1997 | McNair et al. |
| 5,598,349 A | 1/1997 | Elliason et al. |
| 5,603,451 A | 2/1997 | Helander et al. |
| 5,611,484 A | 3/1997 | Uhrich |
| 5,613,228 A | 3/1997 | Tuttle et al. |
| 5,627,531 A | 5/1997 | Posso et al. |
| 5,642,071 A | 6/1997 | Sevenhans et al. |
| 5,659,303 A | 8/1997 | Adair, Jr. |
| 5,663,774 A | 9/1997 | Baik |
| 5,673,850 A | 10/1997 | Uptegraph |
| 5,682,206 A | 10/1997 | Wehmeyer et al. |
| 5,690,277 A | 11/1997 | Flood |
| 5,720,176 A | 2/1998 | Manson |
| 5,726,603 A | 3/1998 | Chawla et al. |
| 5,745,049 A | 4/1998 | Akiyama et al. |
| 5,745,849 A | 4/1998 | Britton |
| 5,761,083 A | 6/1998 | Brown et al. |
| 5,767,664 A | 6/1998 | Price |
| 5,767,791 A | 6/1998 | Stoop et al. |
| 5,782,036 A | 7/1998 | Bertieri et al. |
| 5,782,296 A | 7/1998 | Mehta |
| 5,808,294 A | 9/1998 | Neumann |
| 5,808,602 A | 9/1998 | Sellers |
| 5,809,013 A | 9/1998 | Kackman |
| 5,818,428 A | 10/1998 | Eisenbrandt et al. |
| 5,822,544 A | 10/1998 | Chaco et al. |
| 5,825,327 A | 10/1998 | Krasner |
| 5,847,623 A | 12/1998 | Hadjichristos |
| 5,867,763 A | 2/1999 | Dean et al. |
| 5,873,519 A | 2/1999 | Beilfuss |
| 5,877,957 A | 3/1999 | Bennett |
| 5,886,697 A | 3/1999 | Naughton et al. |
| 5,901,183 A | 5/1999 | Garin et al. |
| 5,902,183 A | 5/1999 | D'Souza |
| 5,905,442 A | 5/1999 | Mosebrook et al. |
| 5,909,378 A | 6/1999 | De Milleville |

(56) References Cited

U.S. PATENT DOCUMENTS

| | | | |
|---|---|---|---|
| 5,918,474 | A | 7/1999 | Khanpara et al. |
| 5,931,378 | A | 8/1999 | Schramm |
| 5,937,942 | A | 8/1999 | Bias et al. |
| 5,943,917 | A | 8/1999 | Truong et al. |
| 5,947,372 | A | 9/1999 | Tiernan |
| 5,950,709 | A | 9/1999 | Krueger et al. |
| 5,963,650 | A | 10/1999 | Simionescu et al. |
| 5,973,613 | A | 10/1999 | Reis et al. |
| 5,977,964 | A | 11/1999 | Williams et al. |
| 5,982,445 | A | 11/1999 | Eyer et al. |
| 6,020,881 | A | 2/2000 | Naughton et al. |
| 6,032,867 | A | 3/2000 | Dushane et al. |
| 6,034,603 | A | 3/2000 | Steeves |
| 6,052,600 | A | 4/2000 | Fette et al. |
| 6,058,137 | A | 5/2000 | Partyka |
| 6,059,195 | A | 5/2000 | Adams et al. |
| 6,062,482 | A | 5/2000 | Gauthier et al. |
| 6,066,843 | A | 5/2000 | Scheremeta |
| 6,075,513 | A | 6/2000 | Reddy et al. |
| 6,081,197 | A | 6/2000 | Garrick et al. |
| 6,084,530 | A | 7/2000 | Pidwerbetsky et al. |
| 6,087,930 | A | 7/2000 | Kulka et al. |
| 6,091,715 | A | 7/2000 | Vucetic et al. |
| 6,095,427 | A | 8/2000 | Hoium et al. |
| 6,098,893 | A | 8/2000 | Berglund et al. |
| 6,121,875 | A | 9/2000 | Hamm et al. |
| 6,140,987 | A | 10/2000 | Stein et al. |
| 6,164,374 | A | 12/2000 | Rhodes et al. |
| 6,175,860 | B1 | 1/2001 | Gaucher |
| 6,192,282 | B1 | 2/2001 | Smith et al. |
| 6,196,467 | B1 * | 3/2001 | Dushane et al. ............ 236/46 R |
| 6,198,394 | B1 | 3/2001 | Jacobsen et al. |
| 6,206,295 | B1 | 3/2001 | LaCoste |
| 6,208,331 | B1 | 3/2001 | Singh et al. |
| 6,209,794 | B1 | 4/2001 | Webster et al. |
| 6,211,921 | B1 | 4/2001 | Cherian et al. |
| 6,213,404 | B1 | 4/2001 | Dushane et al. |
| 6,216,956 | B1 | 4/2001 | Ehlers et al. |
| 6,222,191 | B1 | 4/2001 | Myron et al. |
| 6,236,326 | B1 | 5/2001 | Murphy |
| 6,255,988 | B1 | 7/2001 | Bischoff |
| 6,259,074 | B1 | 7/2001 | Brunner et al. |
| 6,259,399 | B1 | 7/2001 | Krasner |
| 6,275,166 | B1 | 8/2001 | del Castillo et al. |
| 6,285,912 | B1 | 9/2001 | Ellison et al. |
| 6,286,764 | B1 | 9/2001 | Garvey et al. |
| 6,290,140 | B1 | 9/2001 | Pesko et al. |
| 6,298,285 | B1 | 10/2001 | Addink et al. |
| 6,315,211 | B1 | 11/2001 | Sartain et al. |
| 6,318,639 | B1 | 11/2001 | Toth |
| 6,330,806 | B1 | 12/2001 | Beaverson et al. |
| 6,344,861 | B1 | 2/2002 | Naughton et al. |
| 6,349,883 | B1 | 2/2002 | Simmons et al. |
| 6,351,693 | B1 | 2/2002 | Monie et al. |
| 6,353,846 | B1 | 3/2002 | Fleeson |
| 6,356,204 | B1 | 3/2002 | Guindi et al. |
| 6,366,572 | B1 | 4/2002 | Esterberg et al. |
| 6,366,622 | B1 | 4/2002 | Brown et al. |
| 6,370,894 | B1 | 4/2002 | Thompson et al. |
| 6,375,087 | B1 | 4/2002 | Day |
| 6,398,118 | B1 | 6/2002 | Rosen et al. |
| 6,400,956 | B1 | 6/2002 | Richton |
| 6,414,963 | B1 | 7/2002 | Gemar |
| 6,415,205 | B1 | 7/2002 | Myron et al. |
| 6,453,687 | B2 | 9/2002 | Sharood et al. |
| 6,478,233 | B1 | 11/2002 | Shah |
| 6,493,643 | B1 | 12/2002 | Aisa |
| 6,502,758 | B2 | 1/2003 | Cottrell |
| 6,518,957 | B1 | 2/2003 | Lehtinen et al. |
| 6,519,509 | B1 | 2/2003 | Nierlich et al. |
| 6,552,525 | B2 | 4/2003 | Bessler |
| 6,574,581 | B1 | 6/2003 | Bohrer et al. |
| 6,578,770 | B1 | 6/2003 | Rosen |
| 6,580,950 | B1 | 6/2003 | Johnson et al. |
| 6,581,846 | B1 * | 6/2003 | Rosen ..................... 236/46 R |
| 6,595,430 | B1 | 7/2003 | Shah |
| 6,604,023 | B1 | 8/2003 | Brown et al. |
| 6,619,555 | B2 | 9/2003 | Rosen |
| 6,621,507 | B1 | 9/2003 | Shah |
| 6,624,750 | B1 | 9/2003 | Marman et al. |
| 6,631,271 | B1 | 10/2003 | Logan |
| 6,636,197 | B1 | 10/2003 | Goldenberg et al. |
| 6,641,054 | B2 | 11/2003 | Morey |
| 6,641,055 | B1 | 11/2003 | Tiernan |
| 6,644,557 | B1 | 11/2003 | Jacobs |
| 6,645,066 | B2 | 11/2003 | Gutta et al. |
| 6,665,613 | B2 | 12/2003 | Duvall |
| 6,726,112 | B1 | 4/2004 | Ho |
| 6,727,816 | B1 | 4/2004 | Helgeson |
| 6,741,158 | B2 | 5/2004 | Engler et al. |
| 6,768,901 | B1 | 7/2004 | Osborn et al. |
| 6,769,482 | B2 | 8/2004 | Wagner et al. |
| 6,783,079 | B2 | 8/2004 | Carey et al. |
| 6,785,255 | B2 | 8/2004 | Sastri et al. |
| 6,786,421 | B2 | 9/2004 | Rosen |
| 6,788,271 | B1 | 9/2004 | Koo et al. |
| 6,789,739 | B2 | 9/2004 | Rosen |
| 6,814,299 | B1 | 11/2004 | Carey |
| 6,823,181 | B1 | 11/2004 | Kohno et al. |
| 6,824,069 | B2 | 11/2004 | Rosen |
| 6,833,990 | B2 | 12/2004 | LaCroix et al. |
| 6,836,506 | B2 | 12/2004 | Anderson |
| 6,838,978 | B2 | 1/2005 | Aizu et al. |
| 6,851,621 | B1 * | 2/2005 | Wacker et al. ................... 236/51 |
| 6,891,838 | B1 | 5/2005 | Petite et al. |
| 6,901,066 | B1 | 5/2005 | Helgeson |
| D506,150 | S | 6/2005 | Backlund et al. |
| D506,689 | S | 6/2005 | Backlund et al. |
| 6,909,891 | B2 | 6/2005 | Yamashita et al. |
| 6,931,078 | B2 | 8/2005 | Mccorkle et al. |
| 6,931,445 | B2 | 8/2005 | Davis |
| 6,951,306 | B2 | 10/2005 | DeLuca |
| 6,967,565 | B2 | 11/2005 | Lingemann |
| 6,975,958 | B2 | 12/2005 | Bohrer et al. |
| 6,987,793 | B2 | 1/2006 | Dhar et al. |
| 6,990,335 | B1 | 1/2006 | Shamoon et al. |
| 6,990,821 | B2 | 1/2006 | Singh et al. |
| 6,996,402 | B2 | 2/2006 | Logan et al. |
| 7,000,849 | B2 | 2/2006 | Ashworth et al. |
| 7,001,495 | B2 | 2/2006 | Essalik et al. |
| 7,002,910 | B2 | 2/2006 | Garcia-luna-aceves et al. |
| 7,014,336 | B1 | 3/2006 | Ducharme et al. |
| 7,015,789 | B1 | 3/2006 | Helgeson |
| 7,024,336 | B2 | 4/2006 | Salsbury et al. |
| 7,028,912 | B1 | 4/2006 | Rosen |
| 7,035,805 | B1 | 4/2006 | Miller |
| 7,050,026 | B1 | 5/2006 | Rosen |
| 7,055,759 | B2 | 6/2006 | Wacker et al. |
| 7,058,524 | B2 | 6/2006 | Hayes et al. |
| 7,083,109 | B2 | 8/2006 | Pouchak |
| 7,108,194 | B1 | 9/2006 | Hankins, II |
| 7,109,970 | B1 | 9/2006 | Miller |
| 7,110,832 | B2 | 9/2006 | Ghent |
| 7,111,788 | B2 | 9/2006 | Reponen |
| 7,114,554 | B2 | 10/2006 | Bergman et al. |
| 7,117,129 | B1 | 10/2006 | Bash et al. |
| 7,130,719 | B2 | 10/2006 | Ehlers et al. |
| 7,140,551 | B2 | 11/2006 | de Pauw et al. |
| 7,141,748 | B2 | 11/2006 | Tanaka et al. |
| 7,142,948 | B2 | 11/2006 | Metz |
| 7,146,253 | B2 | 12/2006 | Hoog et al. |
| 7,146,348 | B2 | 12/2006 | Geib et al. |
| 7,149,729 | B2 | 12/2006 | Kaasten et al. |
| 7,152,806 | B1 * | 12/2006 | Rosen ............................. 236/94 |
| 7,156,318 | B1 | 1/2007 | Rosen |
| 7,159,789 | B2 | 1/2007 | Schwendinger et al. |
| 7,159,790 | B2 | 1/2007 | Schwendinger et al. |
| 7,181,317 | B2 | 2/2007 | Amundson et al. |
| 7,184,524 | B2 | 2/2007 | Digate et al. |
| 7,188,482 | B2 | 3/2007 | Sadegh et al. |
| 7,222,494 | B2 | 5/2007 | Peterson et al. |
| 7,222,800 | B2 | 5/2007 | Wruck |
| 7,225,054 | B2 | 5/2007 | Amundson et al. |
| 7,240,289 | B2 | 7/2007 | Naughton et al. |

(56) References Cited

U.S. PATENT DOCUMENTS

| | | | |
|---|---|---|---|
| 7,246,087 B1 | 7/2007 | Ruppelt et al. |
| 7,258,280 B2 | 8/2007 | Wolfson |
| 7,264,175 B2 | 9/2007 | Schwendinger et al. |
| 7,274,972 B2 | 9/2007 | Amundson et al. |
| 7,287,709 B2 | 10/2007 | Proffitt et al. |
| 7,298,716 B2 | 11/2007 | Abraham et al. |
| 7,299,996 B2 | 11/2007 | Garrett et al. |
| 7,302,642 B2 | 11/2007 | Smith et al. |
| 7,327,250 B2 | 2/2008 | Harvey |
| 7,333,880 B2 | 2/2008 | Brewster et al. |
| 7,346,467 B2 | 3/2008 | Bohrer et al. |
| 7,379,791 B2 | 5/2008 | Tamarkin et al. |
| 7,379,997 B2 | 5/2008 | Ehlers et al. |
| 7,392,115 B2 | 6/2008 | Schindler |
| RE40,437 E | 7/2008 | Rosen |
| 7,394,782 B2 | 7/2008 | Davis |
| 7,412,265 B2 | 8/2008 | Chen et al. |
| 7,434,742 B2 | 10/2008 | Mueller et al. |
| 7,446,647 B2 | 11/2008 | Helgeson |
| 7,450,926 B2 | 11/2008 | Chang et al. |
| 7,451,937 B2 | 11/2008 | Flood et al. |
| 7,455,240 B2 | 11/2008 | Chapman, Jr. et al. |
| 7,469,550 B2 | 12/2008 | Chapman, Jr. et al. |
| 7,471,942 B2 | 12/2008 | Subramanian et al. |
| 7,509,753 B2 | 3/2009 | Nicosia et al. |
| 7,552,030 B2 | 6/2009 | Guralnik et al. |
| 7,558,648 B2 | 7/2009 | Hoglund et al. |
| 7,571,865 B2 | 8/2009 | Nicodem et al. |
| 7,584,899 B2 | 9/2009 | de Pauw et al. |
| 7,596,431 B1 | 9/2009 | Forman et al. |
| 7,600,694 B2 | 10/2009 | Helt et al. |
| 7,604,046 B2 | 10/2009 | Bergman et al. |
| 7,614,567 B2 | 11/2009 | Chapman, Jr. et al. |
| 7,620,409 B2 | 11/2009 | Budampati et al. |
| 7,624,931 B2 | 12/2009 | Chapman, Jr. et al. |
| 7,634,504 B2 | 12/2009 | Amundson |
| 7,636,042 B2 | 12/2009 | Hameed et al. |
| 7,641,126 B2 | 1/2010 | Schultz et al. |
| 7,643,908 B2 | 1/2010 | Quirino et al. |
| 7,644,869 B2 | 1/2010 | Hoglund et al. |
| 7,667,163 B2 | 2/2010 | Ashworth et al. |
| 7,684,408 B2 | 3/2010 | Wakabayashi |
| 7,689,843 B2 | 3/2010 | Hassan et al. |
| 7,693,582 B2 | 4/2010 | Bergman et al. |
| 7,693,809 B2 | 4/2010 | Gray |
| 7,702,424 B2 | 4/2010 | Cannon et al. |
| 7,703,694 B2 | 4/2010 | Mueller et al. |
| 7,706,923 B2 | 4/2010 | Amundson et al. |
| 7,768,393 B2 | 8/2010 | Nigam |
| 7,778,734 B2 | 8/2010 | Oswald et al. |
| 7,784,704 B2 | 8/2010 | Harter |
| 7,802,618 B2 | 9/2010 | Simon et al. |
| 7,812,274 B2 | 10/2010 | Dupont et al. |
| 7,839,275 B2 * | 11/2010 | Spalink et al. ............... 340/501 |
| 7,845,576 B2 | 12/2010 | Siddaramanna et al. |
| 7,848,900 B2 | 12/2010 | Steinberg et al. |
| 7,854,389 B2 | 12/2010 | Ahmed |
| 7,904,209 B2 | 3/2011 | Podgorny et al. |
| 7,904,830 B2 | 3/2011 | Hoglund et al. |
| 7,908,211 B1 | 3/2011 | Chen et al. |
| 7,913,925 B2 | 3/2011 | Ashworth |
| 7,949,615 B2 | 5/2011 | Ehlers et al. |
| 7,973,678 B2 | 7/2011 | Petricoin, Jr. et al. |
| 8,010,237 B2 | 8/2011 | Cheung et al. |
| 8,019,567 B2 | 9/2011 | Steinberg et al. |
| 8,024,073 B2 * | 9/2011 | Imes et al. ................... 700/276 |
| 8,037,022 B2 | 10/2011 | Rahman et al. |
| 8,042,048 B2 | 10/2011 | Wilson et al. |
| 8,063,775 B2 | 11/2011 | Reed et al. |
| 8,064,935 B2 | 11/2011 | Shamoon et al. |
| 8,078,330 B2 | 12/2011 | Brickfield et al. |
| 8,082,065 B2 | 12/2011 | Imes et al. |
| 8,090,477 B1 | 1/2012 | Steinberg |
| 8,091,375 B2 | 1/2012 | Crawford |
| 8,099,195 B2 | 1/2012 | Imes et al. |
| 8,108,076 B2 | 1/2012 | Imes et al. |
| 8,131,497 B2 | 3/2012 | Steinberg et al. |
| 8,139,623 B2 | 3/2012 | Nielsen et al. |
| 8,170,720 B2 | 5/2012 | Amundson et al. |
| 8,174,381 B2 | 5/2012 | Imes et al. |
| 8,180,492 B2 | 5/2012 | Steinberg |
| 8,219,249 B2 | 7/2012 | Harrod et al. |
| 8,219,250 B2 | 7/2012 | Dempster et al. |
| 8,219,251 B2 | 7/2012 | Amundson et al. |
| 8,239,922 B2 | 8/2012 | Sullivan et al. |
| 8,280,536 B1 | 10/2012 | Fadell et al. |
| 8,301,765 B2 | 10/2012 | Goodman |
| 8,350,697 B2 | 1/2013 | Trundle et al. |
| 8,396,602 B2 | 3/2013 | Imes et al. |
| 8,412,381 B2 | 4/2013 | Nikovski et al. |
| 8,412,382 B2 | 4/2013 | Imes et al. |
| 8,428,782 B2 | 4/2013 | Imes |
| 8,428,867 B2 | 4/2013 | Ashley, Jr. et al. |
| 8,457,797 B2 | 6/2013 | Imes et al. |
| 8,473,109 B1 | 6/2013 | Imes et al. |
| 8,478,447 B2 | 7/2013 | Fadell et al. |
| 8,498,749 B2 | 7/2013 | Imes et al. |
| 8,509,954 B2 | 8/2013 | Imes et al. |
| 8,510,255 B2 | 8/2013 | Fadell et al. |
| 8,571,518 B2 | 10/2013 | Imes et al. |
| 8,600,564 B2 | 12/2013 | Imes et al. |
| 8,606,374 B2 | 12/2013 | Fadell et al. |
| 8,626,344 B2 | 1/2014 | Imes et al. |
| 8,630,741 B1 | 1/2014 | Matsuoka et al. |
| 8,723,664 B2 | 5/2014 | Rezvani et al. |
| 8,748,745 B2 | 6/2014 | Imes et al. |
| 8,752,771 B2 | 6/2014 | Warren et al. |
| 8,754,775 B2 | 6/2014 | Holcombe |
| 8,757,507 B2 | 6/2014 | Fadell et al. |
| 8,798,804 B2 | 8/2014 | Besore et al. |
| 8,840,033 B2 | 9/2014 | Steinberg |
| 8,855,830 B2 | 10/2014 | Imes et al. |
| 8,909,256 B2 | 12/2014 | Fraccaroli |
| 2001/0029585 A1 | 10/2001 | Simon et al. |
| 2001/0052459 A1 | 12/2001 | Essalik et al. |
| 2002/0005435 A1 | 1/2002 | Cottrell |
| 2002/0011923 A1 | 1/2002 | Cunningham et al. |
| 2002/0022991 A1 | 2/2002 | Sharood et al. |
| 2002/0092779 A1 | 7/2002 | Essalik et al. |
| 2002/0146985 A1 | 10/2002 | Naden |
| 2003/0009265 A1 | 1/2003 | Edwin |
| 2003/0034897 A1 | 2/2003 | Shamoon et al. |
| 2003/0034898 A1 * | 2/2003 | Shamoon et al. ........ 340/825.72 |
| 2003/0040842 A1 | 2/2003 | Poth |
| 2003/0042320 A1 | 3/2003 | Decker |
| 2003/0086393 A1 | 5/2003 | Vasudevan et al. |
| 2003/0198280 A1 | 10/2003 | Wang et al. |
| 2004/0027271 A1 | 2/2004 | Schuster et al. |
| 2004/0034484 A1 | 2/2004 | Solomita, Jr. et al. |
| 2004/0055446 A1 | 3/2004 | Robbin et al. |
| 2004/0117330 A1 | 6/2004 | Ehlers et al. |
| 2004/0149478 A1 | 8/2004 | Staiger |
| 2004/0249479 A1 | 12/2004 | Shorrock |
| 2004/0256472 A1 | 12/2004 | DeLuca |
| 2004/0260427 A1 | 12/2004 | Wimsatt |
| 2004/0262410 A1 | 12/2004 | Hull |
| 2005/0040247 A1 | 2/2005 | Pouchak |
| 2005/0060107 A1 | 3/2005 | Rodenberg, III et al. |
| 2005/0090915 A1 | 4/2005 | Geiwitz |
| 2005/0119766 A1 | 6/2005 | Amundson et al. |
| 2005/0128067 A1 | 6/2005 | Zakrewski |
| 2005/0171645 A1 | 8/2005 | Oswald et al. |
| 2005/0189429 A1 | 9/2005 | Breeden |
| 2005/0192915 A1 | 9/2005 | Ahmed et al. |
| 2005/0204997 A1 | 9/2005 | Fournier |
| 2005/0280421 A1 | 12/2005 | Yomoda |
| 2006/0056322 A1 | 3/2006 | Simpson et al. |
| 2006/0079983 A1 | 4/2006 | Willis |
| 2006/0111816 A1 * | 5/2006 | Spalink et al. ............... 700/276 |
| 2006/0186214 A1 | 8/2006 | Simon et al. |
| 2006/0196953 A1 | 9/2006 | Simon et al. |
| 2007/0037610 A1 | 2/2007 | Logan |
| 2007/0045430 A1 | 3/2007 | Chapman et al. |
| 2007/0045433 A1 | 3/2007 | Chapman et al. |

(56) References Cited

U.S. PATENT DOCUMENTS

| | | |
|---|---|---|
| 2007/0045441 A1 | 3/2007 | Ashworth et al. |
| 2007/0045444 A1 | 3/2007 | Gray |
| 2007/0050732 A1 | 3/2007 | Chapman |
| 2007/0057079 A1 | 3/2007 | Stark |
| 2007/0099626 A1 | 5/2007 | Lawrence et al. |
| 2007/0114295 A1 | 5/2007 | Jenkins |
| 2007/0115902 A1 | 5/2007 | Shamoon et al. |
| 2007/0158442 A1 | 7/2007 | Chapman et al. |
| 2007/0158444 A1 | 7/2007 | Naujok et al. |
| 2007/0173978 A1 | 7/2007 | Fein et al. |
| 2007/0185728 A1 | 8/2007 | Schwarz et al. |
| 2007/0207841 A1 | 9/2007 | Amerga et al. |
| 2007/0225867 A1 | 9/2007 | Moorer et al. |
| 2007/0227721 A1 | 10/2007 | Springer et al. |
| 2007/0228183 A1 | 10/2007 | Kennedy et al. |
| 2007/0241203 A1 | 10/2007 | Wagner et al. |
| 2007/0257120 A1 | 11/2007 | Chapman et al. |
| 2007/0271006 A1 | 11/2007 | Golden et al. |
| 2007/0278320 A1 | 12/2007 | Lunacek et al. |
| 2008/0006709 A1 | 1/2008 | Ashworth et al. |
| 2008/0011864 A1 | 1/2008 | Tessier et al. |
| 2008/0015742 A1 | 1/2008 | Kulyk et al. |
| 2008/0027885 A1 | 1/2008 | Van Putten et al. |
| 2008/0054082 A1 | 3/2008 | Evans et al. |
| 2008/0191045 A1 | 8/2008 | Harter |
| 2008/0219227 A1 | 9/2008 | Michaelis |
| 2008/0223136 A1 | 9/2008 | Yakabe et al. |
| 2008/0228325 A1 | 9/2008 | Schindler |
| 2008/0238406 A1 | 10/2008 | Banhegyesi |
| 2008/0245480 A1 | 10/2008 | Knight et al. |
| 2008/0272934 A1 | 11/2008 | Wang et al. |
| 2008/0273754 A1 | 11/2008 | Hick et al. |
| 2008/0277486 A1 | 11/2008 | Seem et al. |
| 2008/0290183 A1 | 11/2008 | Laberge et al. |
| 2008/0317292 A1 | 12/2008 | Baker et al. |
| 2009/0001180 A1 | 1/2009 | Siddaramanna et al. |
| 2009/0001181 A1 | 1/2009 | Siddaramanna et al. |
| 2009/0001182 A1 | 1/2009 | Siddaramanna et al. |
| 2009/0045804 A1* | 2/2009 | Durling et al. ............ 324/140 R |
| 2009/0057424 A1 | 3/2009 | Sullivan et al. |
| 2009/0112335 A1 | 4/2009 | Mehta et al. |
| 2009/0140056 A1 | 6/2009 | Leen |
| 2009/0140057 A1 | 6/2009 | Leen |
| 2009/0143916 A1 | 6/2009 | Boll et al. |
| 2009/0171862 A1 | 7/2009 | Harrod et al. |
| 2009/0195349 A1* | 8/2009 | Frader-Thompson et al. 340/3.1 |
| 2009/0215534 A1 | 8/2009 | Wilson et al. |
| 2009/0216380 A1 | 8/2009 | Kolk |
| 2009/0254225 A1 | 10/2009 | Boucher et al. |
| 2009/0259346 A1* | 10/2009 | Reed et al. .................... 700/295 |
| 2009/0259713 A1 | 10/2009 | Blumrich et al. |
| 2009/0271042 A1 | 10/2009 | Voysey |
| 2009/0283603 A1 | 11/2009 | Peterson et al. |
| 2009/0297901 A1 | 12/2009 | Kilian et al. |
| 2009/0312969 A1 | 12/2009 | Sundaresh et al. |
| 2009/0312999 A1 | 12/2009 | Kasztenny et al. |
| 2009/0327354 A1 | 12/2009 | Resnick et al. |
| 2010/0019051 A1 | 1/2010 | Rosen |
| 2010/0025483 A1 | 2/2010 | Hoeynck et al. |
| 2010/0052576 A1 | 3/2010 | Steiner et al. |
| 2010/0063644 A1 | 3/2010 | Kansal et al. |
| 2010/0070084 A1 | 3/2010 | Steinberg et al. |
| 2010/0070085 A1 | 3/2010 | Harrod et al. |
| 2010/0070086 A1 | 3/2010 | Harrod et al. |
| 2010/0070088 A1 | 3/2010 | Harrod et al. |
| 2010/0070089 A1 | 3/2010 | Harrod et al. |
| 2010/0070091 A1 | 3/2010 | Watson et al. |
| 2010/0070096 A1 | 3/2010 | Rauscher et al. |
| 2010/0070234 A1 | 3/2010 | Steinberg et al. |
| 2010/0070907 A1 | 3/2010 | Harrod et al. |
| 2010/0081375 A1 | 4/2010 | Rosenblatt et al. |
| 2010/0082174 A1 | 4/2010 | Weaver |
| 2010/0084482 A1 | 4/2010 | Kennedy et al. |
| 2010/0106305 A1 | 4/2010 | Pavlak et al. |
| 2010/0107070 A1 | 4/2010 | Devineni et al. |
| 2010/0107076 A1 | 4/2010 | Grohman et al. |
| 2010/0127854 A1 | 5/2010 | Helvick et al. |
| 2010/0138008 A1 | 6/2010 | Chambers et al. |
| 2010/0148947 A1 | 6/2010 | Morgan et al. |
| 2010/0167783 A1 | 7/2010 | Alameh et al. |
| 2010/0179704 A1 | 7/2010 | Ozog |
| 2010/0198425 A1 | 8/2010 | Donovan |
| 2010/0211224 A1 | 8/2010 | Keeling et al. |
| 2010/0262298 A1 | 10/2010 | Johnson et al. |
| 2010/0262299 A1 | 10/2010 | Cheung et al. |
| 2010/0280667 A1 | 11/2010 | Steinberg |
| 2010/0287559 A1 | 11/2010 | Mergen et al. |
| 2010/0289643 A1 | 11/2010 | Trundle et al. |
| 2010/0308119 A1 | 12/2010 | Steinberg et al. |
| 2010/0318227 A1 | 12/2010 | Steinberg et al. |
| 2010/0324437 A1 | 12/2010 | Freeman et al. |
| 2010/0327766 A1 | 12/2010 | Recker et al. |
| 2011/0015798 A1 | 1/2011 | Golden et al. |
| 2011/0015802 A1 | 1/2011 | Imes |
| 2011/0035060 A1 | 2/2011 | Oswald |
| 2011/0046756 A1 | 2/2011 | Park |
| 2011/0046782 A1 | 2/2011 | Fixell |
| 2011/0046792 A1 | 2/2011 | Imes et al. |
| 2011/0046799 A1 | 2/2011 | Imes et al. |
| 2011/0046805 A1 | 2/2011 | Bedros et al. |
| 2011/0046806 A1 | 2/2011 | Nagel et al. |
| 2011/0054710 A1 | 3/2011 | Imes et al. |
| 2011/0077896 A1 | 3/2011 | Steinberg et al. |
| 2011/0125329 A1 | 5/2011 | Oswald |
| 2011/0137614 A1 | 6/2011 | Wheeler |
| 2011/0151837 A1 | 6/2011 | Winbush, III |
| 2011/0153089 A1 | 6/2011 | Tiemann et al. |
| 2011/0153525 A1 | 6/2011 | Benco et al. |
| 2011/0160913 A1 | 6/2011 | Parker et al. |
| 2011/0173542 A1 | 7/2011 | Imes et al. |
| 2011/0185895 A1 | 8/2011 | Freen |
| 2011/0196539 A1 | 8/2011 | Nair et al. |
| 2011/0214060 A1 | 9/2011 | Imes et al. |
| 2011/0224838 A1 | 9/2011 | Imes et al. |
| 2011/0288905 A1 | 11/2011 | Mrakas |
| 2011/0306304 A1 | 12/2011 | Forutanpour et al. |
| 2011/0307103 A1 | 12/2011 | Cheung et al. |
| 2012/0017611 A1 | 1/2012 | Coffel et al. |
| 2012/0033584 A1 | 2/2012 | Corroy |
| 2012/0064923 A1 | 3/2012 | Imes et al. |
| 2012/0065783 A1 | 3/2012 | Fadell et al. |
| 2012/0065935 A1 | 3/2012 | Steinberg et al. |
| 2012/0066168 A1 | 3/2012 | Fadell et al. |
| 2012/0072033 A1 | 3/2012 | Imes et al. |
| 2012/0085831 A1 | 4/2012 | Kopp |
| 2012/0092142 A1 | 4/2012 | Patel et al. |
| 2012/0093141 A1 | 4/2012 | Imes et al. |
| 2012/0125559 A1 | 5/2012 | Fadell et al. |
| 2012/0125592 A1 | 5/2012 | Fadell et al. |
| 2012/0126019 A1 | 5/2012 | Warren et al. |
| 2012/0126020 A1 | 5/2012 | Filson et al. |
| 2012/0126021 A1 | 5/2012 | Warren et al. |
| 2012/0130546 A1 | 5/2012 | Matas et al. |
| 2012/0130548 A1 | 5/2012 | Fadell et al. |
| 2012/0130679 A1 | 5/2012 | Fadell et al. |
| 2012/0131504 A1 | 5/2012 | Fadell et al. |
| 2012/0158350 A1 | 6/2012 | Steinberg et al. |
| 2012/0165993 A1 | 6/2012 | Whitehouse |
| 2012/0172027 A1 | 7/2012 | Partheesh et al. |
| 2012/0209730 A1 | 8/2012 | Garrett |
| 2012/0221151 A1 | 8/2012 | Steinberg |
| 2012/0239203 A1 | 9/2012 | Amundson et al. |
| 2012/0324119 A1 | 12/2012 | Imes et al. |
| 2013/0030732 A1* | 1/2013 | Shetty et al. .................... 702/62 |
| 2013/0054758 A1 | 2/2013 | Imes et al. |
| 2013/0054863 A1 | 2/2013 | Imes et al. |
| 2013/0073094 A1 | 3/2013 | Knapton et al. |
| 2013/0099977 A1 | 4/2013 | Sheshadri et al. |
| 2013/0151012 A1 | 6/2013 | Shetty et al. |
| 2013/0225196 A1 | 8/2013 | James et al. |
| 2013/0318217 A1 | 11/2013 | Imes et al. |
| 2013/0325190 A1 | 12/2013 | Imes et al. |
| 2013/0332000 A1 | 12/2013 | Imes et al. |
| 2014/0058568 A1 | 2/2014 | Imes et al. |
| 2014/0128001 A1 | 5/2014 | Imes et al. |

(56) References Cited

U.S. PATENT DOCUMENTS

| | | | |
|---|---|---|---|
| 2014/0164118 | A1 | 6/2014 | Polachi |
| 2014/0172176 | A1 | 6/2014 | Deilmann et al. |
| 2014/0191848 | A1 | 7/2014 | Imes et al. |
| 2014/0244048 | A1 | 8/2014 | Ramachandran et al. |
| 2014/0258386 | A1 | 9/2014 | Imes et al. |
| 2014/0277762 | A1 | 9/2014 | Drew |
| 2014/0297766 | A1 | 10/2014 | Imes et al. |
| 2014/0316587 | A1 | 10/2014 | Imes et al. |
| 2014/0349672 | A1 | 11/2014 | Kern, Jr. et al. |
| 2015/0019736 | A1 | 1/2015 | Imes et al. |
| 2015/0025697 | A1 | 1/2015 | Imes et al. |
| 2015/0026316 | A1 | 1/2015 | Imes et al. |

FOREIGN PATENT DOCUMENTS

| | | | |
|---|---|---|---|
| CH | 673184 | | 2/1990 |
| DE | 3334117 | A1 | 4/1985 |
| DE | 352917 | | 2/1987 |
| DE | 19548650 | | 6/1997 |
| DE | 19609390 | | 9/1997 |
| DE | 4344172 | | 10/2006 |
| EP | 0196069 | | 1/1986 |
| EP | 0434926 | | 7/1991 |
| EP | 0565507 | | 10/1993 |
| EP | 0574230 | | 12/1993 |
| EP | 0607562 | | 7/1994 |
| EP | 0893931 | | 1/1999 |
| EP | 0678204 | B1 | 3/2000 |
| EP | 0985994 | | 3/2000 |
| EP | 1074009 | | 2/2001 |
| EP | 2260563 | | 10/2011 |
| FR | 2592977 | | 7/1987 |
| GB | 2273593 | | 6/1994 |
| JP | S59-106311 | | 6/1984 |
| JP | H1-252850 | | 10/1989 |
| JP | 2002087050 | | 3/2002 |
| JP | 2003054290 | | 2/2003 |
| MX | 2012000906 | A | 9/2012 |
| SK | SI 20556 | | 10/2001 |
| WO | WO 9307702 | | 4/1993 |
| WO | WO 97/11448 | | 3/1997 |
| WO | WO 97/39392 | | 10/1997 |
| WO | WO 9818225 | | 4/1998 |
| WO | WO 00/43870 | | 7/2000 |
| WO | WO 0070572 | | 11/2000 |
| WO | WO 01/52515 | | 7/2001 |
| WO | WO 01/79952 | | 10/2001 |
| WO | WO 01/93779 | | 12/2001 |
| WO | 2009036764 | A2 | 3/2009 |
| WO | WO 2011/072332 | | 6/2011 |
| WO | 2013170791 | | 11/2013 |
| WO | WO 2013/170791 | * | 11/2013 |
| WO | 2014016705 | | 1/2014 |
| WO | WO 2014/016705 | * | 1/2014 |
| WO | 2014047501 | A1 | 3/2014 |
| WO | WO 2014/047501 | | 3/2014 |
| WO | 2014197320 | A1 | 12/2014 |

OTHER PUBLICATIONS

"A Full Range of Alternative User Interfaces for Building Occupants and Operators," http://www.automatedbuildings.com/news/jan00/articles/andover/andover.htm, 5 pages, dated Jan. 2000, printed Sep. 20, 2004.
"CorAccess Systems/In Home," http://web.archive.org/web20011212084427/www.coraccess.com/home.html, 1 page, copyright 2001, printed Aug. 19, 2004.
"HAI Company Background," http://www.homeauto.com/AboutHAI/abouthai_main.htm, 2 pages, printed Aug. 19, 2004.
"High-Tech Options Take Hold in New Homes-200-08-28-Dallas Business Journal," http://bizjournals.com/dallas/stories/2000/08/28/focus4, 3 pages, dated Aug. 28, 2008, printed Aug. 19, 2004.
"Home Toys Review-TouchLinc," http://www.hometoys.com/htinews/aug99/reviews/touchlinc.htm, 3 pages, dated Aug. 1999, printed Aug. 20, 2004.
"Mark of Excellence Award Finalist Announced," http://64.233.167.104/search?Q=cache:ciOA2YtYaBIJ:www.hometoys.com/releases/mar . . . , 6 pages, Leopard Touchscreen on p. 2, dated prior to Mar. 4, 2000, printed Aug. 20, 2004.
"Medium Access Control (MAC) and Physical (PHY) Specifications," ANSI/IEEE Std 802.11, pp. 177-179, 1999.
"Product Review-Philips Pronto Remote Control," http://hometheaterhifi.com/volume_6_2/philipsprontoremotecontrol.html, 5 pages, dated May 1999, printed Aug. 20, 2004.
"Product Specification for Advanced Pager Receiver UAA2082", Philips, Integrated Circuits, 41 pages, Jan. 15, 1996.
"RC X10 Automation Forum: Control Your Heating and Cooling System with Pronto (1/1)," http://www.remotecentral.com/cgi-bin/mboard/rc-x10/thread.cgi?12, 2 pages, dated Apr. 23, 1999, printed Aug. 20, 2004.
"Spotlight on Integrated Systems," Custom Builder, V8, N2, p. 66(6), Mar.-Apr. 1993.
"Vantage Expands Controls for Audio/Video, HVAC and Security," http://www.Hometoys.com/htinews/aug99/realease/vantage03.htm, 2 pages, dated Aug. 3, 1999, printed Aug. 20, 2004.
"ZigBee Wireless Networking Software," EmberNet ZigBee, 2 pages, prior to Jun. 17, 2005.
Abidi, "Direct-Conversion Radio Transceivers for Digital Communications," IEEE Journal of Solid-State Circuits, vol. 30, No. 12, pp. 1399-1410, Dec. 1995.
Abidi, "Upconversion and Downconversion Mixers for CMOS Wireless Transceivers," copyright AAA, 42 pages, 1996.
ADI, "Leopard User Manual," 93 pages, 2001.
Adicon 2500, "The Automator," 4 pages, Oct.-Dec. 2000.
ADT Security Services, "iCenter Advanced User Interface 8142ADT," Installation and Setup Guide, 5 pages, May 2001; First Sale Feb. 2001.
ADT Security Systems, "iCenter Advanced User Interface 8142ADT User Guide," pp. 1-136, 2001.
Aprilaire Electronic Thremostats Models 8344, 8346, 8348, 8363, 8365, 8366 Operating Instructions, 8 pages, prior to Dec. 2, 2003.
Aube Technologies, Electronic Thermostat for Heating System Model TH135-01, 5 pages, Aug. 14, 2001.
Aube Technologies, TH140-28 Electronic Programmable Thermostat, Installation Instructions and User Guide, pp. 1-4, Jan. 22, 2004.
AutomatedBuildings.com Article—"Thin Client" Solutions, "Pressure, Air Flow, Temperature, Humidity & Valves," Dwyer Instruments, Inc., 5 pages, printed Sep. 20, 2004.
Barley et al., "Procedure for Measuring and Reporting Commercial Building Energy Performance," NREL Technical Report, NRLE/TP-550-38601, 102 pages, Oct. 2005.
Blake et al., "Seng 310 Final Project Demo Program," Illustration, 3 pages, Apr. 6, 2001.
Blake et al., "Seng 310 Final Project," Report, dated Apr. 6, 2001.
Blister Pack Insert from a Ritetemp 8082 Touch Screen Thermostat Product, 2 pages, 2002.
Braeburn Model 3000 Owner's Manual, pp. 1-13, 2001.
Braeburn Model 5000 Owner's Manual, pp. 1-17, 2001.
BRK Electronics Maximum Protection Plus Ultimate Convenience Smoke Alarm, 24 pages, prior to Dec. 2, 2003.
BRK First Alert, User's Manual, Smoke and Fire Alarms, pp. 1-7, Nov. 2002.
Bryant, "Installation and Start-Up Instructions Evolution Control SYSTXBBUID01," 12 pages, 2004.
Business Wire, "MicroTouch Specialty Products Group to Capitalize on Growing Market for Low-Cost Digital Matrix Touchscreens,"pp. 1174 (2 pages), Jan. 6, 1999.
Cardio Manual, available at http://www.secant.ca/en/documentation/cardio2é-Manual.pdf, Cardio Home Automation Inc., 55 pages, printed Sep. 28, 2004.
Cardio, by Secant; http://www.hometoys.com/htinews/apr98/reviews/cardio.htm, "HTINews.Review," Feb. 1998, 5 pages, printed Sep. 14, 2004.
Carrier Microelectronic Programmable Thermostat Owner's Manual, pp. 1-24, May 1994.
Carrier TSTATCCRF01 Programmable Digital Thermostat, pp. 1-21, prior to Dec. 2, 2003.

(56) References Cited

OTHER PUBLICATIONS

Carrier, "Programmable Dual Fuel Thermostat," Installation, Start-Up & Operating Instructions, pp. 1-12, Oct. 1998.
Carrier, "Programmable Thermostats," Installation, Start-Up & Operating Instructions, pp. 1-16, Sep. 1998.
Carrier, "Standard Programmable Thermostat," Homeowner's Manual, pp. 1-8, 1998.
Carrier, "Thermidistat Control," Installation, Start-Up, and Operating Instructions, pp. 1-12, Aug. 1999.
Chang et al., "A CMOS Channel-Select Filter for a Direct-Conversion Wireless Receiver," IEEE Journal of Solid-State Circuits, vol. 32, No. 5, pp. 722-729, May 1997.
Cheng et al., "TPS: A Time-Based Positioning Scheme for Outdoor Wireless Sensor Networks," IEEE INFOCOM 2004, 12 pages, 2004.
Chiasserini et al., "An Analytical Model for Wireless Sensor Networks with Sleeping Nodes," IEEE Transactions on Mobile Computing, vol. 5, No. 12, pp. 1706-1718, Dec. 2006.
Climatouch, User Manual, Climatouch CT03TSB Thermostat, Climatouch CT03TSHB Thermostat with Humididty Control, Outdoor UHF Temperature Transmitter 217S31, 19 pages, Printed Sep. 15, 2004.
File History for ReExam Control No. 95/002,041, Patent No. 7,634,504, ReExamination Filed Jul. 18, 2012.
U.S. Appl. No. 13/556,971, filed Jul. 24, 2012.
CorAccess, "Companion 6," User Guide, pp. 1-20, Jun. 17, 2002.
Craig, "Zigbee: Wireless Control That Simply Works," 7 pages, prior to Jun. 17, 2005.
Crols et al., "CMOS Wireless Transceiver Design," Kluwer Academic Publishers, 22 pages, 1997.
Danfoss RT51/51 RF & RT52/52RF User Instructions, 2 pages, Jun. 2004.
DeKoven et al., "Designing Collaboration in Consumer Products," 2 pages, 2001.
DeKoven et al., "Measuring Task Models in Designing Intelligent Products," pp. 188-189, 2002.
Domotique Secant Home Automation-Web Page, available at http://www.secant.ca/en/company/default.asp, 1 page, printed Sep. 28, 2004.
Ecobee, "Meet the Ecobee Smart Thermostat," Sales Sheet, 2 pages, prior to Jun. 16, 2009.
Ecobee, Screenshot of Ecobee Web Site Window, Captured prior to Jun. 16, 2009.
Ecobee, Smart Thermostat Installation Manual, pp. 1-26, 2009.
Ecobee, Smart Thermostat User Manual, pp. 1-32, 2009.
Firex Smoke Alarm, Ionization Models AD, ADC Photoelectric Model Pad, 4 pages, prior to Dec. 2, 2003.
Freudenthal et al., "Communicating Extensive Smart Home Functionality to Users of All Ages: The Design of a Mixed-Initiative Multimodal Thermostat-Interface," pp. 34-39, Mar. 12-13, 2001.
Gentex Corporation, 9000 Series, Photoelectric Type Single Station/Multi-Station Smoke Alarms AC Powered with Battery Backup, Installation Instructions-Owner's Information, pp. 9-1 to 9-6, Jan. 1, 1993.
Gentex Corporation, HD135, 135° Fixed Temperature Heat Detector AC Powered, 120V, 60Hz with Battery Backup, Installation Instructions-Owner's Information, pp. 1-5, Jun. 1, 1998.
Honeywell Brivis Deluxe Programmable Thermostat, pp. 1-20, 2002.
Honeywell Brivis T8602C Chronotherm IV Deluxe Programmable Thermostats, Installation Instructions, pp. 1-12, 2002.
Honeywell CT8602C Professional Fuel Saver Thermostat, pp. 1-6, 1995.
Honeywell Electronic Programmable Thermostat, Owner's Guide, pp. 1-20, 2003.
Honeywell Electronic Programmable Thermostats, Installation Instructions, pp. 1-8, 2003.
Honeywell News Release, "Honeywell's New Sysnet Facilities Integration System for Boiler Plant and Combustion Safety Processes," 4 pages, Dec. 15, 1995.
Honeywell T8002 Programmable Thermostat, Installation Instructions, pp. 1-8, 2002.

Honeywell T8602 A, B, C, D and TS8602 A, C Chronotherm III Fuel Saver Thermostats, Installation Instructions, pp. 1-12, 1995.
Honeywell T8602D Chronotherm IV Deluxe Programmable Thermostats, Installation Instructions, pp. 1-12, 2002.
Honeywell TH8000 Series Programmable Thermostats, Owner's Guide, pp. 1-44, 2004.
Honeywell, "Excel Building Supervisor-Integrated R7044 and FS90 Ver. 2.0," Operator Manual, 70 pages, Apr. 1995.
Honeywell, "Introduction of the 57350A Honeywell WebPAD Information Appliance," Home and Building Control Bulletin, 2 pages, Aug. 29, 2000; Picture of Web Pad Device with touch Screen, 1 page; and screen shots of WebPad Device, 4 pages.
Honeywell, "Vision Pro 8000 Touchscreen Programmable Thermostat," Honeywell International Inc., 40 pages, 2004.
Honeywell, "W7006A Home Controller Gateway User Guide," 31 pages, Jul. 2001.
Honeywell, MagicStat® CT3200 Programmable Thermostat, Installation and Programming Instructions, pp. 1-24, 2001.
http://wiki.personaltelco.net/index.cgi/PhasedArray?action=print, "Phased Array—Personal Telco Wiki," 3 pages, May 2, 2005.
http://www.bamboweb.com/articles/o/s/OSI_model.html, "Bambooweb OSI model," Bambooweb Dictionary, 5 pages, printed May 23, 2005.
http://www.cc.gatech.edu/computing /classes/cs6751_94_fall/groupc/climate-2/node1.html, "Contents," 53 pages, printed Sep. 20, 2004.
http://www.dailywireless.org/modules.php?name=News&file=article&sid=871, "Location by Triangulation—Not," Daily Wireless, 2 pages, printed May 2, 2005.
http://www.ecobee.com/productspecifications, "Programmable Thermostats and Other Green Living Products—Specifications," 2 pages, 2009.
http://www.hometoys.com/htinews/apr99/releases/hal01.htm, HTI News Release, pp. 1-3.
http://www.ritetemp.info/rtMenu_13.html, RiteTemp 8082, 6 pages, printed Jun. 20, 2003.
http://www.thermostatsales.com, Robershaw, "9610 Digital Programmable Thermostat," 3 pages, printed Jun. 17, 2004.
http://www.thermostatsales.com, Robershaw, "9700 Digital Programmable Thermostat," 3 pages, printed Jun. 17, 2004.
http://www.thermostatsales.com, Robershaw, "9710 Digital Programmable Thermostat," 3 pages, printed Jun. 17, 2004.
http://www.thermostatsales.com, Robershaw, "9720 Digital Programmable Thermostat," 3 pages, printed Jun. 17, 2004.
http://www.unstrung.com/document.asp?site=unstrung&doc_id15069&page_number=1, 11 pages, printed May 2, 2005.
http://www.zigbee.org/en/about/faq.asp, "Wireless Control That Simply Works," ZigBee Alliance, 8 pages, printed Feb. 2, 2005.
Hunter, "44200/44250," Owner's Manual, 32 pages, printed prior to Dec. 2, 2003.
Hunter, "44300/44350," Owner's Manual, 35 pages, printed prior to Dec. 2, 2003.
Hunter, "Auto Saver 550," Owner's Manual Model 44550, 44 pages, printed prior to Dec. 2, 2003.
Install Guide for Ritetemp Thermostat 8082, 6 pages, 2002.
Invensys Deluxe Programmable Thermostats 9700, 9701, 9715, 9720, User's Manual, 21 pages, prior to Dec. 2, 2003.
Jung et al., "Improving IEEE 802.11 Power Saving Mechanism," 6 pages, Jul. 7, 2004.
Kinney, "ZigBee Technology: Wireless Control That Simply Works," 20 pages, Oct. 2, 2003.
Kleiminger et al., "Occupancy Detection from Electricity Consumption Data," 8 pages, prior to Jul. 27, 2011.
Lee, "The Design of CMOS Radio-Frequency Integrated Circuits," Cambridge University Press, 42 pages, 1998.
Lennox, "Network Control Panel (NCP)," User's Manual, 18 pages, Nov. 1999.
Lux TX9000 Installation, 3 pages, prior to Dec. 2, 2003.
Lux, "511 Series Smart Temp Electronic Thermostat," Owner's Manual, 3 pages, printed prior to Dec. 2, 2003.
Lux, "600 Series Smart Temp Electronic Thermostat," Owner's Manual, 3 pages, printed prior to Dec. 2, 2003.

(56) References Cited

OTHER PUBLICATIONS

Lux, "602 Series Multi-Stage Programmable Thermostat," Owner's Manual, 3 pages, printed prior to Dec. 2, 2003.
Lux, "605/2110 Series Programmable Heat Pump Thermostat," Owner's Manual, 3 pages, printed prior to Dec. 2, 2003.
Lux, "700/9000 Series Smart Temp Electronic Thermostat," Owner's Manual, 3 pages, printed prior to Dec. 2, 2003.
Lux, "ELV1 Programmable Line Voltage Thermostat," Owner's Manual, 3 pages, printed prior to Dec. 2, 2003.
Lux, "PSPH521 Series Programmable Heat Pump Thermostat," Owner's Manual, 3 pages, printed prior to Dec. 2, 2003.
Lux, "TX1500 Series Smart Temp Electronic Thermostat," Owner's Manual, 6 pages, printed prior to Dec. 2, 2003.
Lux, "TX500 Series Smart Temp Electronic Thermostat," Owner's Manual, 3 pages, printed prior to Dec. 2, 2003.
Melfi et al., "Measuring Building Occupancy Using Existing Network Infrastructure," IEEE, 8 pages, 2011.
Metasys, "HVAC PRO for Window's User's Manual," 308 pages, 1998.
Milstein, "Wideband Code Division Multiple Access," IEEE Journal on Selected Areas in Communications, vol. 18, No. 8, pp. 1344-1354, Aug. 2000.
Mounting Template for Ritetemp Thermostat 8082, 1 page, 2002.
Nasipuri et al., "A Directionality Based Location Discovery Scheme for Wireless Sensor Networks," pp. 105-111, prior to Jun. 17, 2005.
Operation manual for Ritetemp Touch Screen Thermostat 8082, 8 pages, 2002.
PCT International Search Report for PCT/US2010/045003 dated Mar. 18, 2011.
Proliphix Inc., "Web Enabled IP Thermostats," 2 pages, prior to Dec. 2, 2003.
Quick Start Guide for Ritetemp Thermostat 8082, 1 page, 2002.
Razavi, "Design Considerations for Direct-Conversion Receivers," IEEE Transactions on Circuits and Systems—II: Analog and Digital Signal Processing, vol. 44, No. 6, pp. 428-435, Jun. 1997.
Remote Control Power Requirement for Ritetemp Thermostat 8082, 1 page, 2002.
Ritetemp Operation 8029, 3 pages, Jun. 19, 2002.
Ritetemp Operation 8050, 5 pages, Jun. 26, 2002.
Ritetemp Operation 8085, pp. 1-6, prior to Dec. 2, 2003.
Rofougaran et al., "A 1 GHz CMOS RF Front-End IC for a Direct-Conversion Wireless Receiver," IEEE Journal of Solid-State Circuits, vol. 31, pp. 880-889, Jul. 1996.
Rofougaran et al., "A 900 MHz CMOS RF Power Amplifier with Programmable Output Power," Proceedings VLSI Circuits Symposium, Honolulu, 4 pages, Jun. 1994.
Savvides et al., "Dynamic Fine-Grained Localization in Ad-Hoc Networks of Sensors," pp. 166-179, prior to Jun. 17, 2005.
Sealed Unit Parts Co., Inc., Supco & CTC Thermostats . . . Loaded with Features, Designed for Value!, 6 pages, prior to Dec. 2, 2003.
Totaline Model P474-1035 Owner's Manual Programmable 5-2 Day Digital Thermostat, pp. 1-21, prior to Dec. 2, 2003.
Totaline Star CPE230RF, Commercial Programmable Thermostat Wireless Transmitter, Owner's Manual, pp. 1-16, Oct. 1998.
Totaline Star P/N P474-0130 Non-Programmable Digital Thermostat Owner's Manual, pp. 1-22, prior to Dec. 2, 2003.
Totaline, "1 for All Programmable Digital Thermostat," Owner's Manual P/N P374-1100FM, 23 pages, Nov. 1998.
Totaline, "1 for All Programmable Digital Thermostat," Owner's Manual P/N P474-1050, 21 pages, Nov. 1998.
Totaline, "1 for All Programmable Digital Thermostat," Owner's Manual P/N P374-1100, 24 pages, Apr. 2001.
Totaline, "Instructions P/N P474-1010," Manual, 2 pages, Dec. 1998.
Totaline, "Intellistat Combination Temperature and Humidity Control," Owner's Manual P/N P374-1600, 25 pages, Jun. 2001.
Totaline, "Programmable Thermostat Configurable for Advanced Heat Pump or Dual Fuel Operation," Owner's Manual P/N P374-1500, 24 pages, Jun. 1999.
Totaline, "Programmable Thermostat," Homeowner's Guide, 27 pages, Dec. 1998.
Totaline, "Wireless Programmable Digital Thermostat," Owner's Manual 474-1100RF, 21 pages, 2000.
Trane, "System Programming, Tracer Summit Version 14, BMTW-SVP01D-EN," 623 pages, 2002.
Trouble Shooting Guide for Ritetemp Thermostat 8082, 1 page, 2002.
Visor Handheld User Guide, Copyright 1999-2000.
Want et al. "The Active Badge Location System," 7 pages, prior to Jun. 17, 2005.
WarmlyYours, "Model TH111GFCI-P (120 VAC)," Manual, pp. 1-4, printed prior to Dec. 2, 2003.
White-Rodgers 1F80-224 Programmable Electronic Digital Thermostat, Installation and Operation Instructions, 8 pages, prior to Dec. 2, 2003.
White-Rodgers Installation Instructions for Heating & Air Conditioning IF78 Non-Programmable Thermostat, 6 pages, prior to Dec. 2, 2003.
White-Rodgers, "Comfort-Set 90 Series Thermostat," Manual, pp. 1-44, printed prior to Dec. 2, 2003.
White-Rodgers, "Comfort-Set III Thermostat," Manual, pp. 1-44, printed prior to Dec. 2, 2003.
White-Rodgers, "Installation Instructions for Heating & Air Conditioning IF72 5/2 Day Programmable Heat Pump Thermostat," 8 pages, printed prior to Dec. 2, 2003.
White-Rodgers, "Installation Instructions for Heating & Air Conditioning IF78 5/2 Day Programmable Thermostat," 7 pages, printed prior to Dec. 2, 2003.
White-Rodgers, Comfort-Set 90 Series Premium, 4 pages, prior to Dec. 2, 2003.
White-Rodgers, IF80-240 "(for Heating Only systems) Programmable Electronic Digital Thermostat," Installation and Operation Instructions, 8 pages, printed prior to Dec. 2, 2003.
White-Rodgers, IF80-241, "Programmable Electronic Digital Thermostat," Installation and Operation Instructions, 6 pages, printed prior to filing date.
White-Rodgers, IF80-261, "Programmable Electronic Digital Thermostat," Installation and Operation Instructions, 8 pages, printed prior to Dec. 2, 2003.
White-Rodgers, IF81-261, "Programmable Electronic Digital Multi-Stage Thermostat," Installation and Operation Instructions, 8 pages, printed prior to Dec. 2, 2003.
White-Rodgers, IF82-261, "Programmable Electronic Digital Heat Pump Thermostat," Installation and Operation Instructions, 8 pages, prior to Dec. 2, 2003.
Wilson et al., "A Single-Chip VHF and UHF Receiver for Radio Paging", IEEE Journal of Solid State Circuits, vol. 26, No. 12, 9 pp. 1944-1950, Dec. 1991.
www.icmcontrols.com, Simplecomfort, SC3000 Single Stage Heat/Single Stage Cool or Single Stage Heat Pump/Manual Changeover, 1 page, printed prior to Dec. 2, 2003.
www.icmcontrols.com, Simplecomfort, SC3001 Single Stage Heat/Single Stage Cool or Single Stage Heat Pump/Manual Changeover, 1 page, printed prior to Dec. 2, 2003.
www.icmcontrols.com, Simplecomfort, SC3006 Single Stage Heat/Single Stage Cool or Single Stage Heat Pump/Manual Changeover, 1 page, printed prior to Dec. 2, 2003.
www.icmcontrols.com, Simplecomfort, SC3201 2 Stage Heat Pump Manual Changeover, 1 page, printed prior to Dec. 2, 2003.
www.icmcontrols.com, Simplecomfort, SC3801 2 Stage Heat/2 Stage Cool 2 Stage Heat Pump/Audio Changeover, 1 page, printed Dec. 2, 2003.
"Icy 18xx Timer-Thermostats," User Manual and Installation Guide, 1 page, 2009.
"Quad Six Magic-Stat(R) Thermostat MS2000 Manual 88-610M_0_001986," 40 pages, 1986.
Akhlaghinia et al., "Occupant Behaviour Prediction in Ambient Intelligence Computing Environment," Journal of Uncertain Systems, vol. 2, No. 2, pp. 85-100, 2008.
Akhlaghinia, et al., "Occupancy Monitoring in Intelligent Environment Through Integrated Wireless Localizing Agents," In 2009 IEEE Symposium on intelligent Agents, Piscataway, NJ, USA, vol. 30, 7 pages, 2009.

(56) References Cited

OTHER PUBLICATIONS

Allen, et al., "Real-Time Earthquake Detection and Hazard Assessment by Alarms Across California," Geophysical Research Letters, vol. 36, L00B08, pp. 1-6, 2009.
Aprilaire Electronic Thermostats Model 8355, 7 Day Programmable 2 Heat/2 Cool Heat Pump, User's Manual, Installation, and Programming, 16 pages, 2000.
Aprilaire Electronic Thermostats, "Model 8353 User's Manual Installation and Programming," Dec. 2000.
Bay Controls LLC. "Bayweb Thermostat Model BW-WT2 Owner's Manual," Revision 1.8, Document # BW-WT4-2DOC, 31 pages. Nov 2, 2011.
Braeburn, "Braeburn Premier Series Programmable Thermostats, Model 5200," 11 pages, 2011.
Braeburn, "Braeburn Premier Series Universal Auto Changeover Up to 3 Heat/2 Cool Heat Pump, or 2 Heat/2 Cool Conventional Thermostat, Model 5300, Installer Guide," 10 pages, 2009.
Braeburn, "Premier Series Programmable Thermostats," pp. 1-20, 2011.
Braeburn, "Premier Series Universal Auto Changeover 5300," pp. 1-28, 2009.
California Energy Commission, "Buildings End-Use energy Efficiency; Alternatives to Compressor Cooling," 80 pages, Jan. 2000.
Carrier "TP-PAC, TP-PHP, TP-NAC, TP-NHP Performance Series AC/HP Thermostat Installation Instructions," 64 pages, Apr. 2009.
Carrier, "TB-PAC, TB-PHP Base Series Programmable Thermostats Installation Instructions," 8 pages, 2012.
Carrier, "SYSTXCCUIZ01-V Infinity Control Installation Instructions," pp. 1-20, 2012.
Chen, et al., "Demand Response-Enabled Residential Thermostat Controls," ACEEE Summer Study on D Energy Efficiency in Buildings, 2008.
Cisco Systems, White Paper, "Wi-Fi Based Real-Time Location Tracking: Solutions and Technology," Cisco Systems, Inc., 2006, 6 pages.
Deleeuw, "Ecobee WiFi enabled Smart Thermostat Part 2: The Features review," pp. 1-7, Dec. 2, 2011.
Ecobee Smart Si Thermostat Installation Manual, 40 pages, 2012.
Ecobee Smart Thermostat Installation Manual, 20 pages, Jun. 29, 2011.
Ecobee, "2 Ecobee Si Thermostat + Geofencing," 17 pages, 2014.
Ecobee, "Introducing the new Smart Si Thermostat," 7 pages, before 2013.
Ecobee, "Smart Si Thermostat User Manual," EB-SmartSiUM-01rev1, 44 pages, 2012.
Ecobee, "Smart Thermostat User's Manual," UM-STAT-106-R4, 20 pages, 2010.
Ecobee, "Smart Thermostat," 5 pages, 2011.
Erickson, et al. "Energy Efficient Building Environment Control Strategies Using Real-Time Occupancy Measurement," ACM Workshop on Embedded Sensing Systems for Energy Efficiency in Buildings, pp. 19-24, 2009.
Fountain, et al., "Comfort control for short-term occupancy," Center for the Built Environment, UC Berkeley, 15 pages, Jan. 14, 1994.
Gao, et al., "The Self-Programming Thermostat: Optimizing Setback Schedules based on Home Occupancy Patterns," BuildSys -09, 6 pages, Nov. 3, 2009.
Honeywell, "CT8775A,C The Digital Round(TM) Non-Programmable thermostats," Honeywell International Inc., 69-1676-1, 20 pages, 2004.
Honeywell, "VisionPro TH8000 Series Touchscreen Programmable Thermostat," Operating Manual, 32 pages, 2011.
Honeywell, "Installation Guide VisionPRO TH8000 Series," pp. 1-11, 2012.
Honeywell, "Operating Manual FocusPRO TH6000 Series," pp. 1-24, 2011.
Honeywell, "Perfect Climate Comfort Center Control System," pp. 1-44, 2001.
Honeywell, "Prestige Product Data," Honeywell International Inc., 2012, 126 pages Honeywell, "T8611G Chronotherm IV Deluxe Programmable Heat Pump Thermostat Installation Instructions," pp. 1-24, 1997.
Honeywell, "THX9321 Prestige 2.0 and THX9421 Prestige IAQ 2.0 with EIM," Product Data, 160 pages, Apr. 2013.
Honeywell, "Prestige TXH9321/9421 Touch Screen Thermostat," Operating Manual, 40 pages, 2011.
http://ambientdevices.com/about/energy-devices, "Ambient Products," 2 pages, 2013.
http://ambientdevices.myshopify.com/products/energy-joule, "Ambient Devices —Energy Joule," 1 page, Dec. 4, 2013.
http://community.lockitron.com/t/notifications-geofencing-scheduling-sense-bluetooth/633, "Notifications, Geofencing, Scheduling, Sense/Bluetooth," 6 pages, printed Oct. 29, 2014.
http://stackoverflow.com/questions/14232712/tracking-multiple-20-locations-with-ios-geofencing, "Tracking Multiple (20+) Locations with Geofencing," 2 pages, printed Oct. 29, 2014.
http://www.duurzaamthuis.nl/review-slimme-thermostat-icy, "Review Slimme Thermostaat Icy," 5 pages, Feb. 17, 2011.
http://www.icy.nl/en/consumer/products/clever-thermostat-pro, "Clever Thermostat Pro—Icy," Overview, 1 page, printed Dec. 4, 2013.
http://www.icy.nl/en/consumerproducts/clever-thermostat, "The Clever Thermostat—Icy," 1 page, printed Dec. 4, 2013.
http://www.icy.nl/en/consumerproducts/clever-thermostat, "The Clever Thermostat—Icy," Features, 1 page, printed Dec. 4, 2013.
http://www.icy.nl1/en/consumerproducts/clever-thermostat, "The Clever Thermostat—Icy," Overview, 1 page, printed Dec. 4, 2013.
Hunter, "Internet Thermostat Installation Guide," 8 page, Aug. 2012.
Icy, "Icy Timer Thermostat Connection to District Heating, Honeywell VC8015 en VC8615," 1 page, downloaded Dec. 4, 2013.
Lennox, "Homeowner's Manual ComfortSense 7000 Series," pp. 1-15, May 2009.
Lennox, "Homeowner's Manual icomfort Touch Thermostat," pp. 1-20, Dec. 2010.
Lennox, "Owner's Guide, ComfortSense 5000 Series Models L5711U and L5732U Programmable Touch Screen Thermostats," p. 1-32, Feb. 2008.
Lu et al., "The Smart Thermostat: Using Occupancy Sensors to Save Energy in Homes," 14 pages, SenSys '10, Nov. 3-5, 2010.
LuxPro, "Instruction Manual LuxPro PSPU732T," 48 pages, prior to 2013.
Meier et al., "Thermostat Interface and Usability: A Survey," 73 pages, Sep. 2010.
Melfi, et al., "Measuring Building Occupancy Using Existing Network Infrastructure," In Green Computing Conference and Workships (IGCC), pp. 1-8, IEEE, 2011.
Mozer, "Lessons from an Adaptive House," University of Colorado Department of Computer Science. 58 pages. http://www.cs.colorado.edu/~mozer/adaptive-house, downloaded Nov. 7, 2011.
Mozer, "The Neural Network House: An Environment that Adapts to its Inhabitants," University of Colorado Department of Computer Science, Techinical Report SS98-02-017, pp. 110-114,1998.
Mozer, M., et al., "The Neurothermostat: Predictive Optimal Control of Residential Heating Systems," Adv. In Neural Info. Proc. Systems 9, pp. 953-959, 1997.
Nest Learning Thermostat Efficiency Simulation White Paper, 22 pages, Oct. 21, 2011.
Network Thermostat, "Network Thermostat RP32 Universal Programmable Communicating Thermostat," Installation and Programming Instructions, 6 pages, downloaded Dec. 5, 2013.
Network Thermostat, "Network Thermostat RP32-WiFi, Wi-Fi Thermostat," 2 pages, 2012.
Network Thermostat, "Net/X WiFi Thermostat," 3 pages, 2011, printed Jun. 12, 2013.
Nordman, et al., "Using Existing Networks for Energy Purposes," in Proceesing of the First ACM Workshop on Embedded Sensing Systems for Energy-Efficiency in Buildings, ACM, 2009, 2 pages.
Peffer et al., "A Tale of Two Houses: The Human Dimension of Demand Response Enabling Technology from A Case Study of an Adaptive Wireless Thermostat," ACEE Summer Study on Energy Efficiency in Buildings, 11 pages, 2008.
Robertshaw, "9620 Digital Programmable Thermostat User's Manual," pp. 1-14, 2001.

(56) References Cited

OTHER PUBLICATIONS

Robertshaw, "9801i2, 9825i2 Deluxe Programmable Thermostats," pp. 1-36, Jul. 17, 2006.
Ros et al., "Multi-Sensor Human Tracking with the Bayesian Occupancy Filter," IEEE, 8 pages, 2009.
Salus, "S-Series Digital Thermostat Model No. ST620, 140x140 Finish Layout," 24 pages, Apr. 29, 2010.
Scott, et al., "PreHeat: Controlling Home Heating Using Occupancy Prediction," in Proceedings of the 13th International Conference on Ubiquitous Computing, pp. 281-291, ACM, 2011.
Trane, "ComfortLink II Installation Guide", pp. 1-20, Mar. 2011.
Trane, "TCONT600AF11MA Programmable Comfort Control, Installation Instructions," 14 pages, Mar. 2006.
Trane, "Trane Communicating Thermostats for Fan Coil Control, User Guide," pp. 1-32, May 2011.
Trane, "Trane Communicating Thermostats for Heat Pump Control," pp. 1-32, May 2011.
Venstar, "Commercial Thermostats T2900, Owner's Manual," pp. 1-26.2, Apr. 2008.
Venstar, "Residential Thermostat T5800 Owner's Manual and Installation Instructions", Revision 5b, 63 pages, before 2013.
VisionPRO TH8000 Series Installation Guide, Honeywell International Inc., 2012, 12 pages.
VisionPRO Wi-Fi Programmable Thermostat Model TH8320WF, Honeywell International Inc., 2012, 48 pages.
Washington State University Extension Energy Program, "Electric Heat Lock Out on Heat Pumps," pp. 1-3, Apr. 2010.
White Rodgers, "Emerson Blue Wireless Comfort Interface 1F98EZ-1621," Emerson Climate Technologies, 28 pages, before 2013.
Wong et al., "Maximum Likelihood Estimation of ARMA Model with Error Processes for Replicated Observations," NUS, Working Paper No. 0217, 19 pages, 2002.
Gupta et al., "Adding GPS-Control to Traditional Thermostats: An Exploration of Potential Energy Savings and Design Challenges," Springer-Verlag Berlin Heidelberg, Massachusettes Institute of Technology, pp. 95-114. 2009. LNC 5538.
"Tracking multiple (20+) locations with iOS geofencing," Stack Overflow, 3 pages, Downloaded Oct. 16, 2014.
Lockitron Community, "Notifications, Geofencing, Scheduling, Sense/Bluetooth," 8 pages, Downloaded Oct. 16, 2014.
"MobiLinc and Geo-fence Awareness," Mobile Integrated Solutions, LLC. 9 pages, 2014.
Pan et al., "A Framework for Smart Location-Based Automated Energy Controls in a Green Building Testbed," 6 pages, Washington University in St. Louis, Downloaded Jan 30, 2015.
Balaji et al., "Sentinel: Occupancy Based HVAC Actuations using Existing WiFi Infrastructure within Commercial Buildings," University of California, San Diego, 2013, 14 pages.
Ecobee, "Ecobee Si Thermostat + Geofencing," Smart Things, Inc., 17 pages, 2014.
Do, "Programmable Communicating Thermostats for Demand Response in California," UC Berkeley PCT Research for Title 24, 26 pages, Jun. 11, 2007.
Green, "PM's Thermostat Guide, Here's a Common Sense Guide to the New Thinking Thermostats," Popular Mechanics, pp. 155-158, Oct. 1985.
"Petition for Inter Partes Review of United States Patent No. 8,571,518 Pursuant to 35 U.S.C 311-319, 37 CFR 42," Inventor Imes et al., dated Oct. 29, 2014.
US 8,638,213, 01/2014, Rezvani et al. (withdrawn)

* cited by examiner

US 9,115,908 B2

SYSTEMS AND METHODS FOR MANAGING A PROGRAMMABLE THERMOSTAT

TECHNICAL FIELD

The present disclosure relates to systems and methods for managing a programmable thermostat.

BACKGROUND

Programmable thermostats (e.g., thermostats designed to adjust temperature according to a number of programmed settings) can be an important part of energy management in many types of structures, including, but not limited to, homes, apartments, and offices. For example, the programmed settings of an area (e.g., a room in a house) can be adjusted according to the time of day and/or the day of the week, thereby reducing and/or eliminating the waste of energy resulting from heating and/or cooling areas at unnecessary times.

Users of programmable thermostats may minimize and/or negate the energy and/or cost saving potential of programmable thermostats by programming them ineffectively (e.g., not using the programmed settings optimally). For example, programmable thermostats may be difficult to program, and/or optimizing their use may require the user to predict the user's heating and/or cooling needs. Users may find that programming a programmable thermostat may be so burdensome as to abandon any attempts to use the programming function altogether. Additionally, a user may improperly program a thermostat causing heating and/or cooling systems to activate at times when the user is not home. This may result in the user's energy bills being unnecessarily expensive.

DETAILED DESCRIPTION

Figure 1:
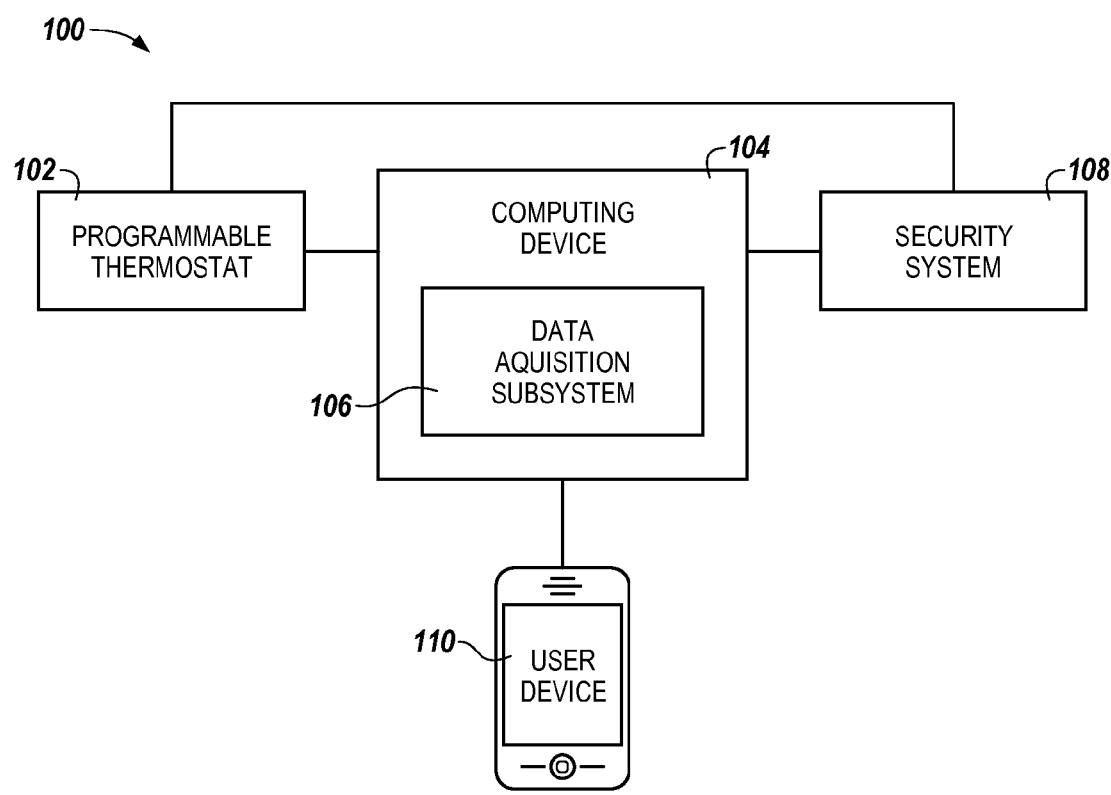
FIG. 1 illustrates a system for managing a programmable thermostat in accordance with one or more embodiments of the present disclosure.

Systems and methods for managing a programmable thermostat are described herein. One or more system embodiments include a thermostat having a first management profile, a data acquisition subsystem configured to receive thermostat data from the thermostat, and a data analysis subsystem. The data analysis subsystem is configured to receive the thermostat data from the data acquisition subsystem, and determine a second management profile for the programmable thermostat based, at least in part, on the thermostat data.

Systems and/or methods in accordance with one or more embodiments of the present disclosure can determine a cost-efficient way to operate a programmable thermostat while satisfying a user's heating and/or cooling needs. Additionally, embodiments of the present disclosure can reduce unneeded usage of heating and/or cooling systems in a structure (e.g., part of a structure). Further, embodiments of the present disclosure can monitor and/or predict a behavior of a user (e.g., a user's return time to the area managed by the programmable thermostat) to determine, for example, when to activate heating, ventilating, and air conditioning (HVAC) systems. Additionally, embodiments according to the present disclosure can develop a more efficient management of a programmable thermostat and communicate that management to the user through, for example, a user device. Further, embodiments of the present disclosure can develop a more efficient management profile of a programmable thermostat and automatically implement that management profile on the programmable thermostat.

In the following detailed description, reference is made to the accompanying drawings that form a part hereof. The drawings show by way of illustration how one or more embodiments of the disclosure may be practiced. These embodiments are described in sufficient detail to enable those of ordinary skill in the art to practice one or more embodiments of this disclosure. It is to be understood that other embodiments may be utilized and that process, electrical, and/or structural changes may be made without departing from the scope of the present disclosure.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2.

As will be appreciated, elements shown in the various embodiments herein can be added, exchanged, combined, and/or eliminated so as to provide a number of additional embodiments of the present disclosure. The proportion and the relative scale of the elements provided in the figures are intended to illustrate the embodiments of the present disclosure, and should not be taken in a limiting sense.

As used herein, "a" or "a number of" something can refer to one or more such things. For example, "a number of programmed set points" can refer to one or more programmed set points.

FIG. 1 illustrates a system 100 for managing a programmable thermostat in accordance with one or more embodiments of the present disclosure. As shown in FIG. 1, system 100 includes a computing device 104 having a data acquisition subsystem 106 and a controller 108. Computing device 104 can be a multi-lingual and/or multi-interface device configured to communicate with a number of link layer interfaces such as, for instance, Ethernet, power line carrier (PLC), Wifi, Homeplug, Redlink, IEEE 802.15.4, Bluetooth, etc.

Although not shown in FIG. 1, computing device 104 can include a memory. Memory can be volatile or nonvolatile memory. Memory can also be removable, e.g., portable memory, or non-removable, e.g., internal memory. For example, memory can be random access memory (RAM) (e.g., dynamic random access memory (DRAM), and/or phase change random access memory (PCRAM)), read-only memory (ROM) (e.g., electrically erasable programmable read-only memory (EEPROM) and/or compact-disk read-only memory (CD-ROM)), flash memory, a laser disk, a digital versatile disk (DVD), and/or other optical disk storage, and/or a magnetic medium such as magnetic cassettes, tapes, or disks, among other types of memory.

Further, although memory can be located within computing device 104, embodiments of the present disclosure are not so limited. For example, memory can also be located internal to another computing resource, e.g., enabling computer readable instructions to be downloaded over the Internet or another wired or wireless connection. Although not shown in FIG. 1, data analysis subsystem 110 can also be a computing device having a processor and a memory in a manner analogous to that previously discussed in connection with computing device 104.

As shown in FIG. 1, computing device 104 and data analysis subsystem 110 are communicatively coupled to a programmable thermostat 102. For example, computing device 104 and data analysis subsystem 110 can communicate with programmable thermostat 102 through a wired and/or wireless connection and/or through the Internet and/or another wired and/or wireless network. Programmable thermostat 102 can include a computing device with a memory and a processor in a manner analogous to that as previously discussed in connection with computing device 104. Programmable thermostat 102 can include devices that allow for a controlled temperature in a structure (e.g., a portion of a structure) and can allow a user to manage a number of settings regarding heating and/or cooling systems. Controlling a temperature can include, by way of example and not limitation, activating and/or deactivating an HVAC system.

Programmable thermostat 102 can have a first management profile. A first management profile can include, for example, a number of operation characteristics of programmable thermostat 102 (e.g., user-programmed operation(s) and/or schedule(s) of programmable thermostat 102). For example, a first management profile can include a temperature at which programmable thermostat 102 activates a heating system and/or a temperature at which programmable thermostat 102 activates an air conditioning system. Further, a first management profile can include a number of time-sensitive and/or day-of-the-week sensitive operations of a HVAC system. For example, a management profile can include programmable thermostat 102 controlling an HVAC system's operations to maintain a temperature of approximately 70 degrees Fahrenheit in a house (e.g., part of a house) from 6:00 am until 8:00 am, and again from 3:30 pm until 4:30 pm Monday through Friday. Further, management profile can include a profile input by a user at programmable thermostat 102 at, for example, a display on programmable thermostat 102 discussed below.

Other details and/or characteristics of a management profile of programmable thermostat 102 can depend on, among other things, the manufacturer, model, and/or complexity of programmable thermostat 102 and/or an HVAC system associated therewith. For example, a modern programmable thermostat may have more options and/or more technologically advanced programming capabilities than an early model programmable thermostat. Additionally, embodiments of the present disclosure do not limit programmable thermostat 102 to a first management profile; rather, programmable thermostat 102 can include any number of management profiles (e.g., a second and/or third management profile in accordance with one or more embodiments of the present disclosure as discussed below).

Although not shown in FIG. 1, programmable thermostat 102, computing device 104, and/or data analysis subsystem 110 can include a user interface (e.g., a number of user interfaces). A user interface can include, for example, a screen that can provide (e.g., display and/or present) information to a user of programmable thermostat 102, computing device 104, and/or data analysis 110. However, embodiments of the present disclosure are not limited to a particular type of user interface.

Data analysis subsystem 108 can execute executable instructions stored in memory to manage programmable thermostat 102, as discussed below, in accordance with one or more embodiments of the present disclosure. For example, data analysis subsystem 108 can execute the executable instructions stored in memory to perform a method for managing a programmable thermostat (e.g., programmable thermostat 102) further described herein (e.g., in connection with FIG. 3).

Data acquisition subsystem 106 can receive thermostat data (e.g., usage data) from programmable thermostat 102 in accordance with one or more embodiments of the present disclosure. Thermostat data can include, but is not limited to, time of day, day of week, holiday/business day, set point(s) (e.g., temperature(s) that a user can desire programmable thermostat 102 to maintain), ambient humidity, ambient temperature, space temperature, space humidity, heater temperature set point, cooler temperature set point, heater relay state(s), and/or cooler relay state(s), and/or combinations of these data and/or other data. Data acquisition subsystem 106 can be configured to receive thermostat data at a predetermined time, at a predetermined interval, and/or at random times and/or intervals.

Data analysis subsystem 108 can receive the thermostat data from data acquisition subsystem 106 and determine a second management profile for the programmable thermostat 102 based, at least in part, on the thermostat data. Data analysis subsystem 108 can receive the thermostat data at a predetermined time, at a predetermined interval, and/or at random times and/or intervals from data acquisition subsystem 106.

Data analysis subsystem 108 can analyze the thermostat data and determine a second management profile that can yield a cost savings to a user of programmable thermostat 102. For example, data analysis subsystem 108 can determine whether programmable thermostat 102 is used daily by a user to program a number of modes, such as "wake," "away," "return," and/or "sleep," among other modes. Utilizing a number of modes can be cost-effective because, for example, a user may desire an indoor temperature of 70 degrees while the user is eating breakfast, but may be less concerned about indoor temperature while the user is away. Thus, the "awake" and "away" modes can be programmed differently to reflect this. If a user is not using these modes in a cost-efficient manner (e.g., the "awake" mode that maintains a temperature of 70 degrees is employed all day in a cold climate), data analysis subsystem 108 can determine that the user could spend less on energy costs by using a number of modes more efficiently and/or cost-effectively. Thus, a second management profile can include a determination that utilization of different modes can save a user costs associated with energy usage.

In addition, data analysis subsystem 108 can determine a second management profile that can include a thermostat schedule that more correctly reflects a user's schedule than the first management profile. For example, data analysis subsystem 108 can determine a number of set points that correspond with a number of heating and/or cooling needs of the user more closely than those of the first management profile. A user's schedule can depend on many factors, including, but not limited to, a particular day of a week, a particular week of a year and/or a season of a year, as well as combinations of these factors and/or other factors.

Data analysis subsystem 108 can use, for example, time clustering and set point deviation analysis to assess the usage of the programmable thermostat 102 from thermostat data. Embodiments of the present disclosure are not so limited, and can include data received from sources outside the programmable thermostat 102. For example, data analysis subsystem 108 can acquire energy usage data from a utility company providing power to the structure (e.g., partial structure) managed by programmable thermostat 102. Data analysis subsystem 108 can compare historical energy usage data and make a number of comparisons between a first management profile (e.g., the management profile previously used in programmable thermostat 102) and a number of potential management profiles, one of which and/or combinations of which can be used to determine the second management profile.

Data analysis subsystem 106 can receive and/or use data in connection with one or more environmental conditions to determine a second management profile. For example, a user can program programmable thermostat 102 to activate a heating system at 8:00 am on weekday mornings to maintain a comfortable temperature. However, data analysis subsystem 108 can determine that because of, for example, unseasonably hot weather, the heating system need not be activated on a particular day in order to maintain a user desired and/or input temperature preference in an area managed by programmable thermostat 102. Data pertaining to one or more environmental conditions can be received by data acquisition system 106 and/or data analysis subsystem 108, and can be derived, for example, from a device such as a temperature sensor (not shown in FIG. 1). Embodiments of the present disclosure do not limit the acquisition of environmental data to sensing devices; rather, environmental data can be acquired from any suitable source, including, for example, a communicative coupling to the Internet and/or a governmental agency promulgating weather information.

As shown in FIG. 1, system 100 includes a user device 110. User device 110 can be a computing device and/or a mobile device (e.g., a cellular telephone and/or personal digital assistant (PDA), among other mobile devices). One or more embodiments according to the present disclosure can allow data analysis subsystem 108 to predict a number of behaviors, including, for example, a return time of a user to an area (e.g., structure) managed by programmable thermostat 102. User device 110 can be equipped with Global Positioning System (GPS) technology allowing data analysis subsystem 108 to receive a location of user device 110. Receiving a location of a user device 110 can be useful to determine occupancy (e.g., presence of a user within an area managed by programmable thermostat 102). For example, if a user typically leaves work on a weekday at approximately 5:30 pm and drives directly to an area managed by programmable thermostat 102, data analysis subsystem 108 can compare a GPS location of the user (e.g., the user carrying user device 110) with a number of energy consumption data associated with the area managed by programmable thermostat 102. Data analysis subsystem 108 can, for example, use this comparison to predict a return time of the user to structure 110. As an additional example, data analysis subsystem 108 can use the predicted return time, at least in part, to determine the second management profile for programmable thermostat 102.

Data analysis subsystem 108 can acquire additional data regarding occupancy as discussed in more detail below in connection with FIG. 2. Additional data regarding occupancy can be used to determine a second management profile in accordance with one or more embodiments of the present disclosure.

Upon determination of the second management profile, system 100 can communicate the second management profile to a user. The second management profile can be communicated, for example, via a message (e.g., a text message and/or email message, among other messages) sent to user device 110. Additionally and/or alternatively, the second management profile can be communicated to a user via a display of a programmable thermostat, such as the display of programmable thermostat 102 as previously discussed, though not shown in FIG. 1. Embodiments of the present disclosure do not limit communication of the second management profile to electronic message(s) and/or display(s) on programmable thermostat 102; rather, any means of communication can be used to apprise a user of the second management profile. Further, the second management profile can be communicated to the user automatically and/or at a predetermined time and/or at a predetermined interval (e.g., schedule). For example, system 100 can communicate the second management profile to a user at the end of a calendar month. Additionally and/or alternatively, the management profile can be communicated to a user upon an input (e.g., request) made by the user via, for example, user device 110 and/or programmable thermostat 102.

System 100 can communicate additional information associated with the second management profile to a user. For example, user device 110 and/or programmable thermostat 102 can display the second management profile and an expected monetary savings from implementation of the second profile. System 100 can also display energy conservation information. For example, the second management profile may conserve energy and have a lesser environmental impact than the first management profile. System 100 can display to the user the lesser impact that may result from implementation of the second management profile. Additionally, system 100 can include a communication to a user and/or a provider regarding an energy performance guarantee service. For example, system 100 can communicate that the second management profile is allowing the user to adhere to a performance guarantee regarding energy usage of an HVAC system controlled by programmable thermostat 102.

Upon communication of the second management profile to a user, the user can indicate and/or verify that the user desires the second management profile to be implemented on programmable thermostat 102. Alternatively, the user can indicate that the user does not desire the second management profile to be implemented on programmable thermostat 102. The user can make either and/or both of these indications via, for example, a user interface associated with programmable thermostat 102. Embodiments of the present disclosure, however, do not limit a user's choices regarding implementation of the of the communicated second management profile to a simple "yes" or "no." System 100 can allow a user to modify the first management profile and/or the second management profile and implement the modified management profile (e.g., modified first management profile and/or modified second management profile) on thermostat 102. The user can make these modifications via, for example, a number of inputs on a user interface of programmable thermostat 102 and/or user device 110, among other sources. A user can also modify either the first or second management profiles without implementation by, for example, storing a modified management profile in a memory of the programmable thermostat and/or computing device 104 for, for example, implementation at a later time.

In addition to, or in place of, communicating the second management profile to a user, system 100 can automatically implement the second management profile on programmable thermostat 102 upon a determination that the second management profile will yield a lower cost to a user than the first management profile. As previously discussed, data analysis subsystem 108 can use a predicted and/or actual cost (e.g., a monetary cost) to a user associated with managing programmable thermostat 102. If the second management profile will yield and/or is likely to yield a lower cost to a user, programmable thermostat 102 can automatically implement the second management profile. Automatic implementation of the second management profile can occur, for example, in addition to communication of the second management profile, and can result from a user input indicating the user desires a more cost-effective management profile to be automatically implemented upon its determination by data analysis subsystem 108.

In addition to communicating and/or implementing the second management profile, data analysis subsystem 108 can allow a user to modify the second profile. For example, a user might approach programmable thermostat 102 and notice that a new (e.g., second) management profile has been implemented on programmable thermostat 102. Although, in this example, data analysis subsystem 108 has determined that the second management profile may be the most cost-efficient profile, and thus has implemented it on programmable thermostat 102, it may be that the user desires to modify the profile. Embodiments of the present disclosure can receive a number of inputs from a user at programmable thermostat 102, user device 110, and/or other locations. Modifications include changes to set points, changes in user schedule, etc. A user can program modifications to the second profile in a manner analogous to normal programming on programmable thermostat 102.

As shown in FIG. 1, system 100 includes a user device 110. User device 110 can include a mobile device (e.g., a cellular telephone and/or a personal digital assistant (PDA), among other mobile devices), however embodiments of the present disclosure do not limit user device 110 to a mobile device; rather, user device 110 can, for example, include a personal computer, among other devices.

Figure 2:
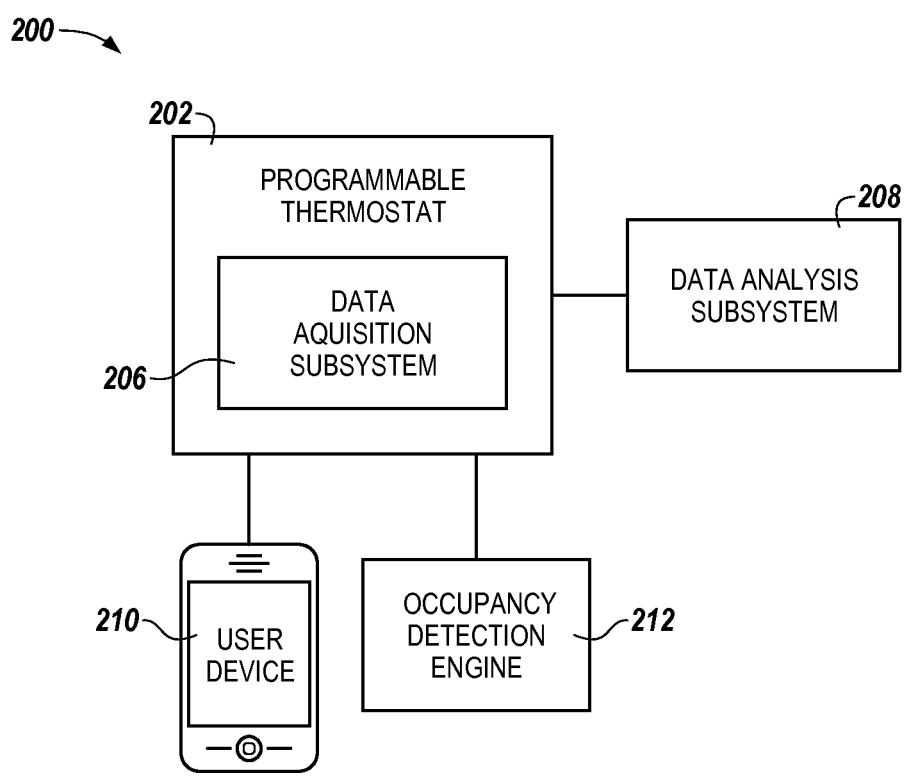
FIG. 2 illustrates a system for managing a programmable thermostat in accordance with one or more embodiments of the present disclosure.

FIG. 2 illustrates a system 200 for managing a programmable thermostat in accordance with one or more embodiments of the present disclosure. As shown in FIG. 2, system 200 includes a programmable thermostat 202 (containing a data acquisition subsystem 206) communicatively coupled to a data analysis subsystem 208, a user device 210, and an occupancy detection engine 212. Although not shown in FIG. 2, user device 210, occupancy detection engine 212, and/or data analysis subsystem 208 can be communicatively coupled directly to each other.

Programmable thermostat 202 can be a programmable thermostat as previously discussed (e.g., programmable thermostat 102 previously discussed in connection with FIG. 1). Data acquisition subsystem 206 can acquire usage data in a manner analogous to data acquisition subsystem 106 gathering thermostat data as previously discussed in connection with FIG. 1. Data analysis subsystem 208 can receive the usage data from programmable thermostat 202 and determine a second management profile for programmable thermostat 202 based, at least in part, on the usage data, in a manner analogous to data analysis subsystem 108 previously discussed in connection with FIG. 1.

User device 210 can be analogous to user device 110 shown in FIG. 1, and as previously discussed. User device 210 can provide a GPS location of a user, and receive the second management profile from data analysis subsystem 208 in a manner analogous to user device 110 as previously discussed.

As shown in FIG. 2, system 200 includes occupancy detection engine 212. Occupancy detection engine 212 can be a subsystem that determines whether a number of occupants (e.g., individuals) are present in an area managed by programmable thermostat 202. Occupancy detection engine 212 can include an occupancy sensor. Occupancy sensors can include a number of sensing devices, for example, acoustic devices, cameras, infrared (IR) sensing devices, carbon dioxide ($CO_2$) detectors, etc. However, occupancy detection engine 212 is not limited to occupancy sensors and/or sensing devices; occupancy detection engine 212 can determine occupancy from a number of factors and/or data. For example, occupancy detection engine 212 can receive energy consumption data from the area managed by programmable thermostat 202 and analyze that data to determine whether an occupant is present. Additionally, occupancy detection engine 212 can determine occupancy for a predetermined time and/or at a predetermined schedule. Historical occupancy data received from occupancy detection engine 212 can be stored in memory (not shown in FIG. 2) in a manner analogous to the memory previously discussed in connection with FIG. 1. A determination of occupancy and/or multiple determinations of occupancy over time can be used by data analysis subsystem to determine the second management profile. Occupancy detection engine 212 may be useful to determine the second management profile because, for example, an area may not need to be heated and/or cooled in the absence of any occupants.

Figure 3:
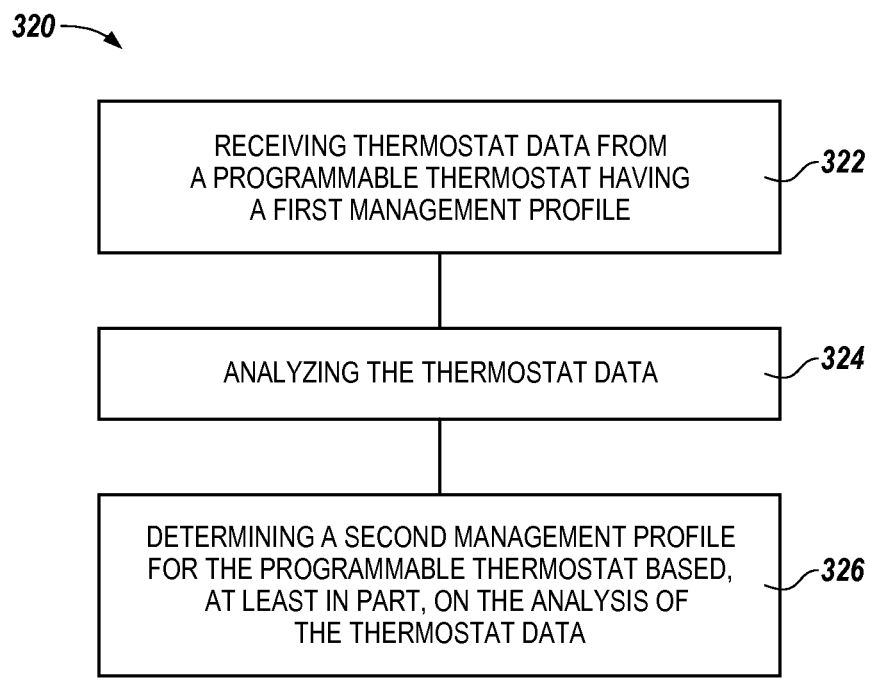
FIG. 3 illustrates a method for managing a programmable thermostat in accordance with one or more embodiments of the present disclosure.

FIG. 3 illustrates a method 303 for managing a programmable thermostat in accordance with one or more embodiments of the present disclosure. Method 303 can be performed, for example, by computing device 110 and/or 210 previously described in connection with FIGS. 1 and 2, respectively, to determine a second management profile for the programmable thermostat.

At block 322, method 320 includes receiving thermostat data from a programmable thermostat having a first management profile. The programmable thermostat can be analogous to a programmable thermostat as previously discussed in connection to FIGS. 1 and 2 (e.g., programmable thermostat 102 and/or 202) and can have a first management profile as previously discussed. Receiving thermostat data can be done in a manner analogous to the receiving of thermostat data from data acquisition subsystem 106 and/or 206 previously discussed in connection with FIGS. 1 and 2.

At block 324, method 320 includes analyzing the thermostat data. Analyzing the thermostat data can include analyzing historical data stored in memory relating to, for example, temperature, humidity, environmental condition(s), occupancy, and/or user inputs, among other data. Analyzing can be in a manner analogous to that previously discussed in connection with FIG. 1 (e.g., time clustering and set point deviation analysis) among other methods.

At block 326, method 320 includes determining a second management profile for the programmable thermostat based, at least in part, on the analysis of the thermostat data. Determining a second management profile can include determining the second management profile as previously discussed in connection with FIG. 1.

Although not shown in FIG. 3, method 320 can include analyzing additional thermostat data, and determining a third management profile for the programmable thermostat based, at least in part, on the analysis of the additional thermostat data. The third management profile can be communicated (e.g., presented on a display) to the user in a manner analogous to the communication of the second management profile. Additionally and/or alternatively, the third management profile can automatically be implemented on the programmable thermostat upon a determination that it will save cost (e.g., monetary cost) to a user over the first and/or second management profiles.

Although specific embodiments have been illustrated and described herein, those of ordinary skill in the art will appreciate that any arrangement calculated to achieve the same techniques can be substituted for the specific embodiments shown. This disclosure is intended to cover any and all adaptations or variations of various embodiments of the disclosure.

It is to be understood that the above description has been made in an illustrative fashion, and not a restrictive one. Combination of the above embodiments, and other embodiments not specifically described herein will be apparent to those of skill in the art upon reviewing the above description.

The scope of the various embodiments of the disclosure includes any other applications in which the above structures and methods are used. Therefore, the scope of various embodiments of the disclosure should be determined with reference to the appended claims, along with the full range of equivalents to which such claims are entitled.

In the foregoing Detailed Description, various features are grouped together in example embodiments illustrated in the figures for the purpose of streamlining the disclosure. This method of disclosure is not to be interpreted as reflecting an intention that the embodiments of the disclosure require more features than are expressly recited in each claim.

Rather, as the following claims reflect, inventive subject matter lies in less than all features of a single disclosed embodiment. Thus, the following claims are hereby incorporated into the Detailed Description, with each claim standing on its own as a separate embodiment.

What is claimed:

1. A system for managing a programmable thermostat, comprising:
    a programmable thermostat having a first management profile;
    a data acquisition subsystem configured to receive thermostat data from the programmable thermostat; and
    a data analysis subsystem configured to:
        receive the thermostat data from the data acquisition subsystem;
        receive data from a mobile device that indicates that a user is returning to a structure managed by the programmable thermostat; and
        determine a second management profile for the programmable thermostat based, at least in part, on the thermostat data and the data received from the mobile device indicating that the user is returning to the structure.

2. The system of claim 1, wherein the data acquisition subsystem is included in a single computing device communicatively coupled to the programmable thermostat and the data analysis subsystem.

3. The system of claim 1, wherein the data acquisition subsystem is included in the mobile device associated with a user of the programmable thermostat.

4. The system of claim 1, wherein the data analysis subsystem is configured to receive occupancy data that indicates whether a user is present in the structure managed by the programmable thermostat.

5. The system of claim 1, wherein the data analysis subsystem is configured to communicate the second management profile to a user according to a predetermined schedule.

6. The system of claim 1, wherein the programmable thermostat is configured to automatically implement the second management profile upon a determination that the second management profile will yield a lower cost to a user than the first management profile.

7. A system for managing a programmable thermostat, comprising:
    a programmable thermostat having a first management profile that uses one or more modes, wherein the programmable thermostat includes a data acquisition subsystem configured to transmit usage data associated with the programmable thermostat; and
    a data analysis subsystem configured to:
        receive the usage data from the programmable thermostat;
        determine a second management profile for the programmable thermostat based, at least in part, on the usage data, wherein the second management profile uses at least one mode that was not used by the first management profile; and
        communicate the second management profile to the programmable thermostat.

8. The system of claim 7, wherein the usage data includes a temperature, a humidity, and a number of programmed set points of the first management profile.

9. The system of claim 7, wherein the data analysis subsystem is configured to determine the second management profile for the programmable thermostat based, at least in part, on a predicted return time of a user.

10. The system of claim 7, wherein the data analysis subsystem is configured to determine the second management profile for the programmable thermostat based, at least in part, on a determination of occupancy in a structure managed by the programmable thermostat.

11. The system of claim 7, wherein the second management profile includes a display of a predicted monetary savings over the first management profile.

12. The system of claim 7, wherein the programmable thermostat is configured to display the second management profile upon a request by a user.

13. The system of claim 7, wherein the second management profile includes a number of programmed set points of the programmable thermostat, wherein programmed set points include an indication of a time that a heating system is activated.

14. The system of claim 7, wherein the programmable thermostat is configured to implement the second management profile upon an input by the user at the programmable thermostat.

15. The system of claim 7, wherein the one or more modes of the first management profile include one or more of a wake mode, an away mode, a return mode, and a sleep mode, and wherein the at least one mode that was not used by the first management profile include one or more of the wake mode, the away mode, the return mode, and the sleep mode.

16. A computer-implemented method for managing a programmable thermostat, comprising:
    reading thermostat data of a programmable thermostat having a first management profile, the thermostat data comprising historical occupancy patterns;
    analyzing the thermostat data including the historical occupancy patterns; and
    determining a second management profile for the programmable thermostat based, at least in part, on the analysis of the thermostat data including the historical occupancy patterns.

17. The method of claim 16, wherein the method includes reading the thermostat data according to a predetermined schedule.

18. The method of claim 16, wherein the thermostat data includes data associated with an environmental condition outside a structure managed by the programmable thermostat.

19. The method of claim 16, wherein the method includes:
    reading additional thermostat data from the programmable thermostat;
    analyzing the additional thermostat data; and
    determining a third management profile for the programmable thermostat based, at least in part, on the analysis of the additional thermostat data.

20. The method of claim 16, wherein the method includes allowing a user to modify the second management profile via a mobile device communicatively linked to the programmable thermostat.

* * * * *